United States Patent
Holcomb et al.

(10) Patent No.: US 11,180,692 B2
(45) Date of Patent: Nov. 23, 2021

(54) USING BRINE RESISTANT SILICON DIOXIDE NANOPARTICLE DISPERSIONS TO IMPROVE OIL RECOVERY

(71) Applicant: Nissan Chemical America Corporation, Houston, TX (US)

(72) Inventors: David L. Holcomb, Florence, AZ (US); Yusra Khan Ahmad, Friendswood, TX (US); John Edmond Southwell, Glen Ellyn, IL (US)

(73) Assignee: Nissan Chemical America Corporation, Houston, TX (US)

( * ) Notice: Subject to any disclaimer, the term of this patent is extended or adjusted under 35 U.S.C. 154(b) by 0 days.

(21) Appl. No.: 17/081,154

(22) Filed: Oct. 27, 2020

(65) Prior Publication Data

US 2021/0040381 A1 Feb. 11, 2021

Related U.S. Application Data

(63) Continuation of application No. 16/179,676, filed on Nov. 2, 2018, now Pat. No. 10,870,794.

(Continued)

(51) Int. Cl.
*C09K 8/84* (2006.01)
*C09K 8/72* (2006.01)
(Continued)

(52) U.S. Cl.
CPC .............. *C09K 8/845* (2013.01); *C09K 8/032* (2013.01); *C09K 8/601* (2013.01); *C09K 8/665* (2013.01);
(Continued)

(58) Field of Classification Search
CPC ........ C09K 8/845; C09K 8/032; C09K 8/601; C09K 8/665; C09K 8/72; C09K 8/80; C09K 2208/10; E21B 43/26
See application file for complete search history.

(56) References Cited

U.S. PATENT DOCUMENTS 3,506,070 A 4/1970 Jones
3,613,786 A 10/1971 Jones et al.
(Continued)

FOREIGN PATENT DOCUMENTS

CN 101735787 A 6/2010
CN 102838981 A 12/2012
(Continued)

OTHER PUBLICATIONS

International Search Report and Written Opinion dated Feb. 13, 2019, in corresponding International Application No. PCT/US2018/058954 (17 pages).

(Continued)

*Primary Examiner* — Crystal J Miller
(74) *Attorney, Agent, or Firm* — Nixon & Vanderhye, PC

(57) ABSTRACT

This invention describes and claims the stimulation of several Wolfcamp and Bone Springs targeted wells in the northern Delaware Basin using fracturing treatments and a new method employing relatively small pre-pad pill volumes of Brine Resistant Silicon Dioxide Nanoparticle Dispersions ahead of each stage of treatment have been successfully performed. The invention includes a method of extending an oil and gas system ESRV comprising the steps of adding a Brine Resistant Silicon Dioxide Nanoparticle Dispersion ("BRINE RESISTANT SDND") to conventional oil well treatment fluids. The invention also includes a method of increasing initial production rates of an oil well by over 20.0% as compared to wells either not treated with the BRINE RESISTANT SDND technology or treated by conventional nano-emulsion surfactants. The Method focuses on the steps of adding a Brine Resistant Silicon Dioxide Nanoparticle Dispersion to conventional oil well treatment fluids.

20 Claims, 24 Drawing Sheets

Related U.S. Application Data

(60) Provisional application No. 62/581,331, filed on Nov. 3, 2017.

(51) Int. Cl.
  *C09K 8/03* (2006.01)
  *C09K 8/66* (2006.01)
  *C09K 8/60* (2006.01)
  *C09K 8/80* (2006.01)
  *E21B 43/26* (2006.01)

(52) U.S. Cl.
  CPC .............. *C09K 8/72* (2013.01); *C09K 8/80* (2013.01); *E21B 43/26* (2013.01); *C09K 2208/10* (2013.01)

(56) References Cited

U.S. PATENT DOCUMENTS

| | | | |
|---|---|---|---|
| 3,623,553 A | 11/1971 | Burdge | |
| 3,740,343 A | 6/1973 | Jones | |
| 3,885,628 A | 5/1975 | Reed et al. | |
| 3,981,361 A | 9/1976 | Healy | |
| 4,240,504 A | 12/1980 | Reed | |
| 4,328,106 A | 5/1982 | Harrar et al. | |
| 4,348,462 A | 9/1982 | Chung | |
| 4,390,068 A | 6/1983 | Patton et al. | |
| 5,381,863 A | 1/1995 | Wehner | |
| 7,033,975 B2 | 4/2006 | Baran, Jr. et al. | |
| 7,101,616 B2 | 9/2006 | Arney et al. | |
| 7,216,712 B2 | 5/2007 | Dalton | |
| 7,380,606 B2 | 6/2008 | Pursley et al. | |
| 7,482,310 B1 | 1/2009 | Reese et al. | |
| 7,544,726 B2 | 6/2009 | Greenwood | |
| 7,553,888 B2 | 6/2009 | Greenwood et al. | |
| 8,101,812 B2 | 1/2012 | Fan et al. | |
| 8,272,442 B2 | 9/2012 | Fan et al. | |
| 8,404,107 B2 | 3/2013 | Fan et al. | |
| 9,068,108 B2 | 6/2015 | Hill et al. | |
| 9,181,468 B2 | 11/2015 | Fan et al. | |
| 9,321,955 B2 | 4/2016 | Hill et al. | |
| 9,428,683 B2 | 8/2016 | Hill et al. | |
| 9,464,223 B2 | 10/2016 | Champagne et al. | |
| 9,505,970 B2 | 11/2016 | Vaughn et al. | |
| 9,512,352 B2 | 12/2016 | Roddy et al. | |
| 9,522,876 B2 | 12/2016 | Winters et al. | |
| 9,685,234 B2 | 6/2017 | Balluchi et al. | |
| 9,708,525 B2 | 7/2017 | Suresh et al. | |
| 9,725,999 B2 | 8/2017 | Castrogiovanni et al. | |
| 9,790,414 B2 | 10/2017 | Champagne et al. | |
| 9,850,418 B2 | 12/2017 | Champagne et al. | |
| 9,868,893 B2 | 1/2018 | Saboowala et al. | |
| 9,884,988 B2 | 2/2018 | Dismuke et al. | |
| 10,113,406 B1 | 10/2018 | Gomaa et al. | |
| 10,160,682 B2 | 12/2018 | Mehta et al. | |
| 2003/0220204 A1* | 11/2003 | Baran, Jr. ............... | C09K 8/58 507/200 |
| 2004/0077768 A1 | 4/2004 | Greenwood | |
| 2007/0238088 A1 | 10/2007 | Rubinsztajn et al. | |
| 2010/0096139 A1 | 4/2010 | Holcomb et al. | |
| 2010/0147515 A1 | 6/2010 | Hughes et al. | |
| 2011/0220360 A1 | 9/2011 | Lindvig et al. | |
| 2012/0024530 A1 | 2/2012 | Todd et al. | |
| 2012/0168165 A1 | 7/2012 | Holcomb et al. | |
| 2012/0175120 A1 | 7/2012 | Holcomb et al. | |
| 2013/0341020 A1 | 12/2013 | Nguyen et al. | |
| 2014/0116695 A1* | 5/2014 | Maghrabi ............... | C09K 8/74 166/279 |
| 2014/0162911 A1 | 6/2014 | Monastiriotis et al. | |
| 2014/0284053 A1 | 9/2014 | Germack | |
| 2014/0332218 A1 | 11/2014 | Castrogiovanni et al. | |
| 2014/0338906 A1 | 11/2014 | Monastiriotis et al. | |
| 2014/0338911 A1 | 12/2014 | Hill et al. | |
| 2014/0374095 A1 | 12/2014 | Ladva et al. | |
| 2015/0068755 A1 | 3/2015 | Hill et al. | |
| 2015/0218435 A1 | 8/2015 | Suresh et al. | |
| 2015/0268370 A1 | 9/2015 | Johnston et al. | |
| 2015/0292308 A1 | 10/2015 | Conway | |
| 2016/0017204 A1 | 1/2016 | Hill et al. | |
| 2016/0137907 A1 | 5/2016 | Vo et al. | |
| 2016/0194550 A1 | 7/2016 | Hill et al. | |
| 2016/0369158 A1 | 12/2016 | Patino | |
| 2017/0114613 A1 | 4/2017 | Lecerf et al. | |
| 2017/0306219 A1 | 10/2017 | Quintero et al. | |
| 2018/0291255 A1 | 10/2018 | Southwell | |
| 2018/0291261 A1 | 10/2018 | Southwell et al. | |
| 2018/0346801 A1* | 12/2018 | Dandawate ............... | C09K 8/68 |
| 2019/0048251 A1 | 2/2019 | Agrawal et al. | |
| 2019/0078015 A1 | 3/2019 | Southwell et al. | |
| 2019/0078016 A1 | 3/2019 | Southwell et al. | |
| 2019/0093462 A1 | 3/2019 | Watts | |
| 2019/0345375 A1 | 11/2019 | Nguyen et al. | |

FOREIGN PATENT DOCUMENTS

| | | |
|---|---|---|
| CN | 106085401 A | 11/2016 |
| EP | 1509676 | 3/2005 |
| EP | 1818693 A1 | 8/2007 |
| EP | 2465911 A1 | 6/2012 |
| JP | H01-035157 | 7/1989 |
| JP | H01234468 A | 9/1989 |
| JP | H0331380 A | 2/1991 |
| JP | H05-086989 | 12/1993 |
| JP | H10111544 A | 4/1998 |
| JP | 2004150859 A | 5/2004 |
| JP | 4033970 B2 | 1/2008 |
| JP | 5026264 B2 | 9/2012 |
| KR | 101872020 B1 | 6/2018 |
| WO | WO1995011280 A1 | 4/1995 |
| WO | WO2003100214 A1 | 12/2003 |
| WO | 2009044912 A1 | 4/2009 |
| WO | WO2010103020 A1 | 9/2010 |
| WO | 2013192634 A2 | 12/2013 |
| WO | WO2014153102 A1 | 9/2014 |
| WO | 2014176188 A1 | 10/2014 |
| WO | WO2014201367 A1 | 12/2014 |
| WO | WO2016040742 A1 | 3/2016 |
| WO | WO2016205289 A1 | 12/2016 |
| WO | 2017011328 A1 | 1/2017 |
| WO | WO2017011328 A1 | 1/2017 |
| WO | WO2017023665 A1 | 2/2017 |
| WO | 2017062086 A1 | 4/2017 |
| WO | 2018157099 A1 | 8/2018 |
| WO | 2018187550 A1 | 10/2018 |
| WO | 2018187563 A1 | 10/2018 |
| WO | WO2018187563 A1 | 10/2018 |
| WO | 2019054414 A1 | 3/2019 |

OTHER PUBLICATIONS

Jurinak and Summers, "Oilfield Applications of Colloidal Silica Gel," SPE Production Engineering, XP055551121, 406-412, 1991.

De Lara, et al., "Functionalized Silica Nanoparticles within Multicomponent Oil/Brine Interfaces: A Study in Molecular Dynamics," J Phys Chem, 120(12):6787-6795 (2016).

Amendment and Response to Office Action with Declaration Under 37 C.F.R. §1.132 filed Jan. 11, 2019 in U.S. Appl. No. 15/946,338.

Farooqui, et al., "Improvement of the Recovery Factor Using Nano-Metal Particles at the Late Stages of Cyclic Steam Stimulation," Society of Petroleum Engineers, XP-002776733, SPE-174478-MS (2015).

Ju, et al., "Enhanced Oil Recovery By Flooding With Hydrophilic Nanoparticles," China Particuology 4(1):41-46 (2006).

Goodwin, et al., "Functionalization of colloidal silica and silica surfaces via silylation reactions," Colloid Polym Sci 268:766-777 (1990).

Zhang, et al., "Foams and Emulsions Stabilized with Nanoparticles for Potential Conformance Control Applications," SPE 121744, SPE International Symposium on Oilfield Chemistry held in the Woodlands, Texas, USA, Apr. 20-22, 2009.

(56) References Cited

OTHER PUBLICATIONS

McElfresh, et al., "Application of Nanofluid Technology to Improve Recovery in Oil and Gas Wells," SPE 154827, SPE International Oilfield Nanotechnology Conference held in Noordwijk, The Netherlands, Jun. 12-14, 2012.
Hoelscher, et al., "Application of Nanotechnology in Drilling Fluids," SPE International Oilfield Nanotechnology Conference held in Noordwijk, The Netherlands, Jun. 12-14, 2012.
Hendraningrat, et al., "A Coreflood Investigation of Nanofluid Enhanced Oil Recovery in Low-Medium Permeability Berea Sandstone," SPE International Symposium on Oilfield Chemistry held in the Woodlands, Texas, USA, Apr. 8-10, 2013.
Arkles, "Hydrophobicity, Hydrophilicity and Silanes," Paint & Coatings Industry Magazine, Oct. 2006.
Extended European Search Report dated Jul. 31, 2017 in European Patent Application No. 17166435.2 (8 pages).
Extended European Search Report dated Jul. 31, 2017 in European Patent Application No. 17166443.6 (7 pages).
Extended European Search Report dated Jul. 31, 2017 in European Patent Application No. 17166426.1 (7 pages).
International Search Report dated Aug. 1, 2018, in corresponding International Patent Application No. PCT/US2018/026227 (15 pages).
Estephan, et al., "Zwitterion-Stabilized Silica Nanoparticles: Toward Nonstick Nano," Langmuir, 26(22):16884-16889 (2010).
Bjorkegren, et al., "Hydrophilic and hydrophobic modifications of colloidal silica particles for Pickering emulsions," Journal of Colloid and Interface Science, 487:250-257 (2017).
Bjorkegren, "Functionalization and characterization of aqueous silica sols and their application in Pickering emulsions," Jan. 1, 2016, XP055492689, Retrieved from the Internet, www://publications.lib.chalmers.se/records/fulltext/246587/246587.pdf. pp. 1-34 and 7 page index (41 pages).
Bjorkegren, et al., "Surface activity and flocculation behavior of polyethylene glycol-functionalized silica nanoparticles," Journal of Colloid and Interface Science, 452:215-223 (2015).
International Search Report dated Aug. 1, 2018, in corresponding International Patent Application No. PCT/US2018/026245 (14 pages).
Brunel, "Functionalized micelle-templated silicas (MTS) and their use as catalysts for fine chemicals," Microporous and Mesoporous Materials, 27(2-3):329-344 (1999).
Non-final Office Action dated Sep. 10, 2018, in corresponding U.S. Appl. No. 15/946,252.
A Search Report dated Oct. 12, 2018 in Great Britain Application No. GB1811749.9 (3 pages).
Alomair, O,A., et al., "Nanofluids Application for Heavy Oil Recovery" SPE International, SPE-171S39-MS, Society of Petroleum Engineers (Oct. 2014).
Aminzadeh, B., et al., "Influence of Surface-Treated Nanoparticles on Displacement Patterns During CO Injection," SPE Annual Technical Conference and Exhibition, 20 pages (Jan. 2013).
Carpenter, "Modeling of Production Decline Caused by Fines Migration in Deepwater Reservoirs" Journal of Petroleum Technology, 75-77 (Feb. 2018).
Denney, "Nanosized Particles for Enhanced Oil Recovery" Journal of Petroleum Technology, 54-46 (Jan. 2011).
EPA, "Method 180.1: Determination of Turbidity by Nephelometry," (Aug. 1993).
Extended European Search Report dated Jan. 8, 2018, in EP Application No. 17194608.0 (6 pages).
International Search Report and Written Opinion for International Application No. PCT/JP2017/037208, European Patent Office, The Hague, dated Jun. 5, 2018, 8 pages.
International Search Report and Written Opinion for International Application No. PCT/US2018/052736, European Patent Office, The Hague, dated Dec. 12, 2018, 9 pages.
International Search Report and Written Opinion for International Application No. PCT/US2018/058954, European Patent Office, The Hague, dated Feb. 13, 2019, 12 pages.

Jurinak, J.J., et al., "Oilfield Applications of Colloidal Silica Gel," SPE Production Engineering, 6(4):406-412 (Nov. 1991), XP055551121.
Li, L., et al., "Gas Selection for Huff-n-Puff EOR in Shale Oil Reservoirs Based upon Experimental and Numerical Study," Society of Petroleum Engineers, SPE-185066-MS, 15 pages (2017).
Li, L., et al., "Optimization of Huff-n-Puff Gas Injection to Enhance Oil Recovery in Shale Reservoirs," Society of Petroleum Engineers, SPE-180219-MS, 18 pages (2016).
Miller, B.J., et al., "Field Case: Cyclic Gas Recovery for Light Oil-Using Carbon Dioxide/Nitrogen/Natural Gas," Society of Petroleum Engineers, SPE 49169, 7 pages (1998).
Wilson, A., "Field Trials of Reservoir Nanoparticles Reveal Stability, High Rates of Recovery," Journal of Petroleum Technology, 64 (11):92-99 (Nov. 2012).
Palmer, F.S., et al., "Design and Implementation of Immiscible Carbon Dioxide Displacement Projects (CO2 Huff-Puff) in South Louisiana," Society of Petroleum Engineers, SPE 15497, 10 pages (1986).
Shafiq, M.U., et al., "Sandstone Matrix Acidizing Knowledge and Future Development," Journal of Petroleum Exploration and Production Technology, 7 (4):1205-1216 (Dec. 2017).
Skauge,T., et al.,"Nano-sized Particles For EOR" SPE International, SPE 129933, Society of Petroleum Engineers (Apr. 2010).
Syfan, F.E., et al., "Enhancing Delaware Basin Stimulation Results Using Nanoparticle Dispersion Technology," Society of Petroleum Engineers, SPE-189876-MS, 24 pages (2018).
Wang et al., "Waterless facturing technologies for unconventional reservoirs—opportunities for liquid nitrogen" Journal of Natural Gas Science and Engineering, 35:160-174 (2016).
Wasan, D., et al., "Spreading of Nanofluids On Solids," Nature, 423:156-159 (May 2003).
Wei et al., "Mechanisms of N2 and CO2 Assisted Steam Huff-n-Puff Process in Enhancing Heavy Oil Recovery: A Case Study Using Experimental and Numerical Simulation," Society of Petroleum Engineers, SPE-183871-MS, 12 pages (2017).
Partial English translation of title page and claims of Chinese Publication No. 101735787 A, published June 16, 2010.
Partial English translation of title page and claims of Chinese Publication No. 102838981 A, published Dec. 26, 2012.
Partial English translation of title page and claims of Chinese Publication No. 106085401 A, published Nov. 6, 2016.
English translation of the Written Opinion for International Application No. PCT/JP2018/033831, Japan Patent Office, dated Nov. 13, 2018, 6 pages.
Written Opinion for International Application No. PCT/JP2018/033831, Japan Patent Office, dated Nov. 13, 2018, 5 pages.
English machine translation of Korean Patent Publication No. 101872020 B1, published Jun. 27, 2018.
Non-Final Office Action dated Sep. 10, 2018, in U.S. Appl. No. 15/946,252 (10 pages).
Non-Final Office Action dated Jun. 5, 2018, in U.S. Appl. No. 15/946,338 (16 pages).
Sears, "Determination of Specific Surface Area of Colloidal Silica by Titration with Sodium Hydroxide", Analytical Chemistry, 28:12, pp. 1981-1983 (Dec. 1956).
English machine translation of Japanese Patent Publication No. H01-035157, published Jul. 24, 1989.
English machine translation of Japanese Patent Publication No. JP H05-086989, published Dec. 15, 1993.
Final Office Action dated Jan. 4, 2019, in U.S. Appl. No. 15/946,252.
Non-Final Office Action dated Jan. 31, 2019, in U.S. Appl. No. 15/946,338.
Non-Final Office Action dated Feb. 27, 2019, in U.S. Appl. No. 16/129,688.
Non-Final Office Action dated Feb. 28, 2019, in U.S. Appl. No. 16/129,705.
Final Office Action dated Mar. 20, 2019, in U.S. Appl. No. 16/141,824.

* cited by examiner

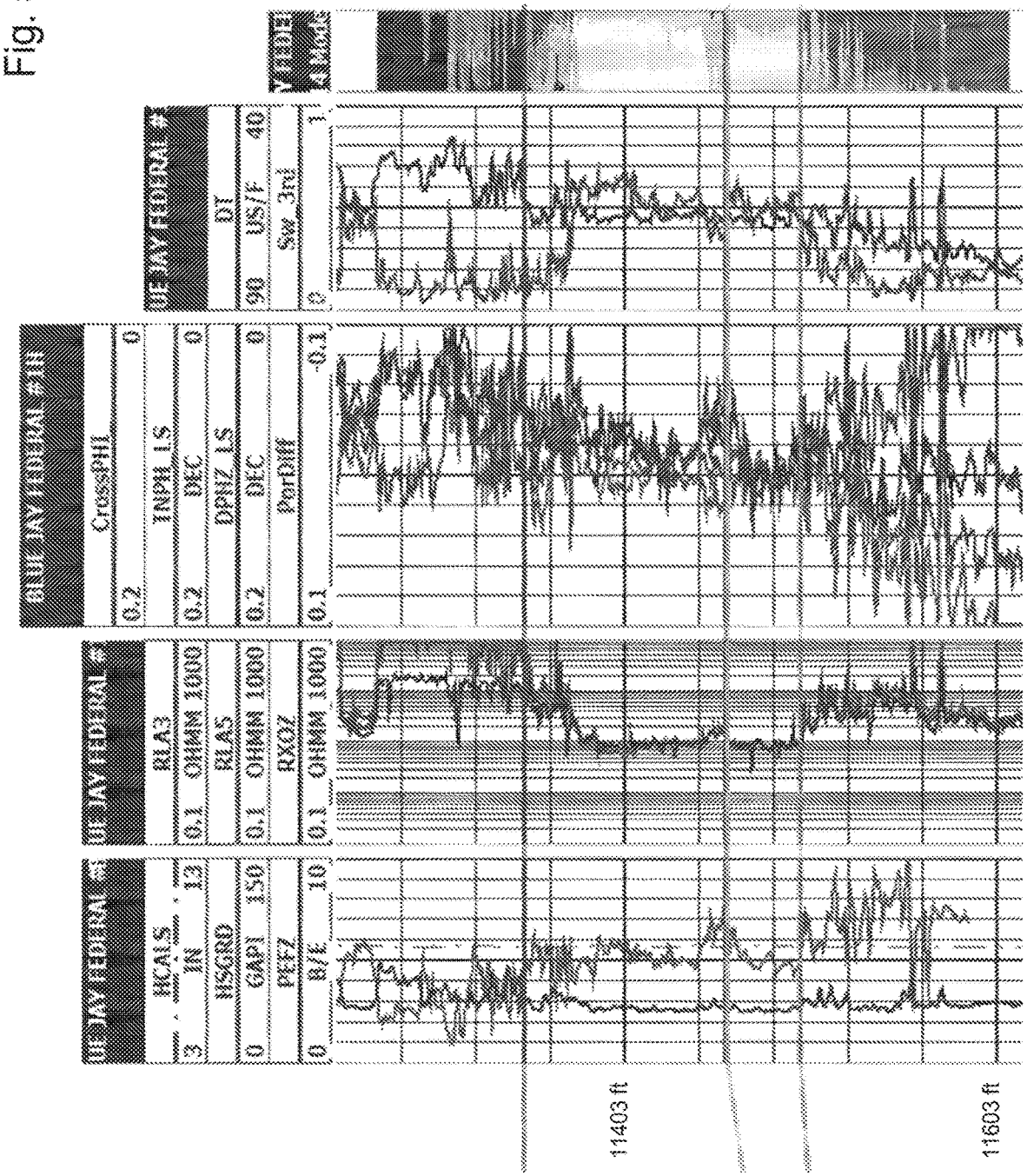
Fig. 5 (Cont. 1)

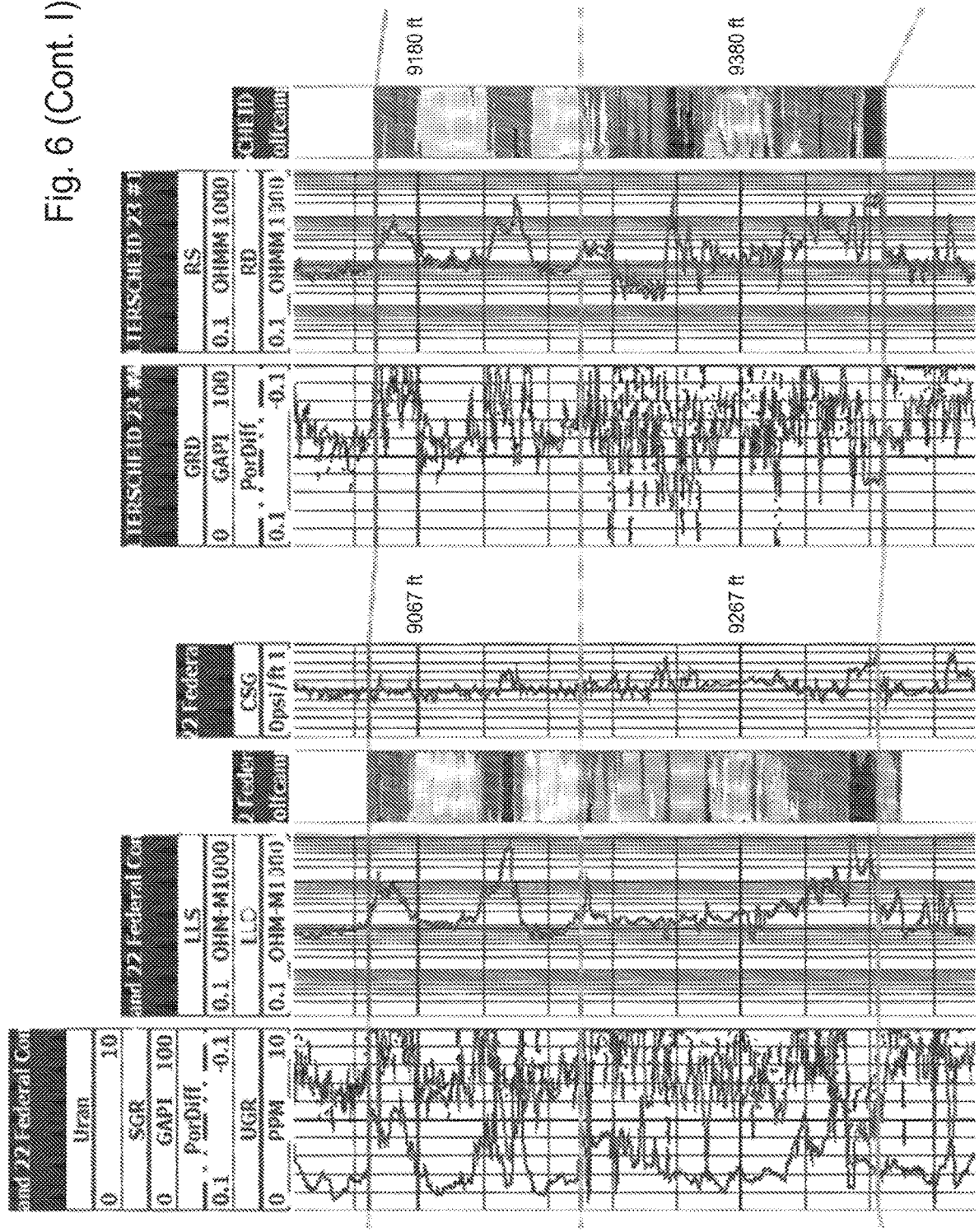
Fig. 6 (Cont. 1)

Fig. 6 (Cont. II)
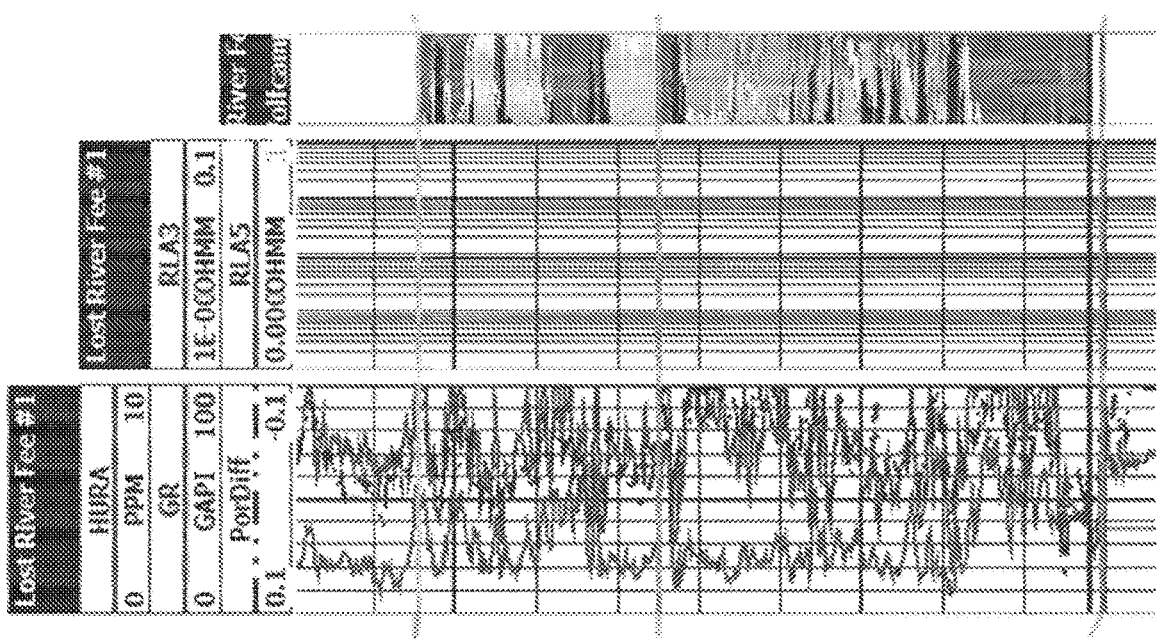

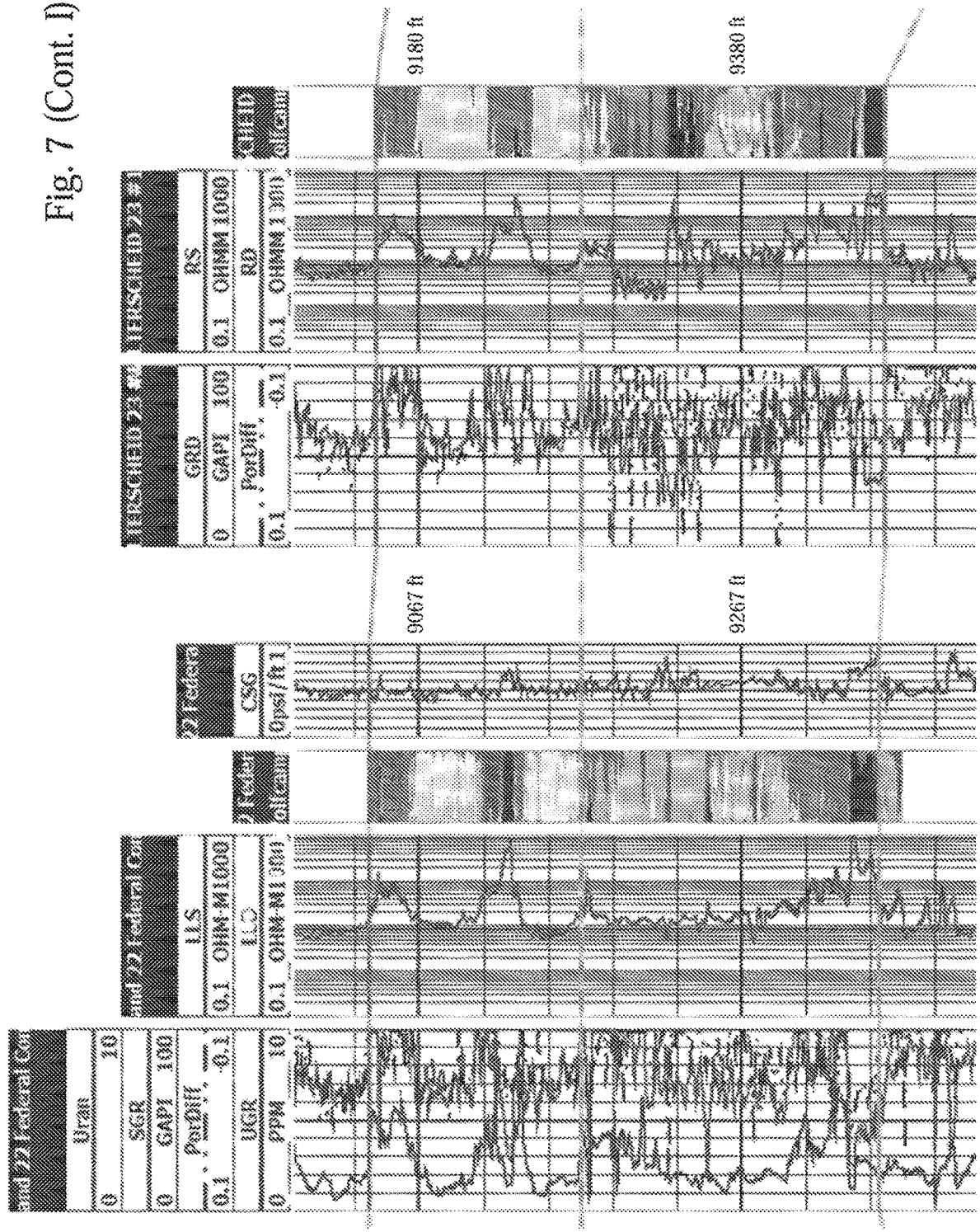
Fig. 7 (Cont. 1)

Fig. 7 (Cont. II)
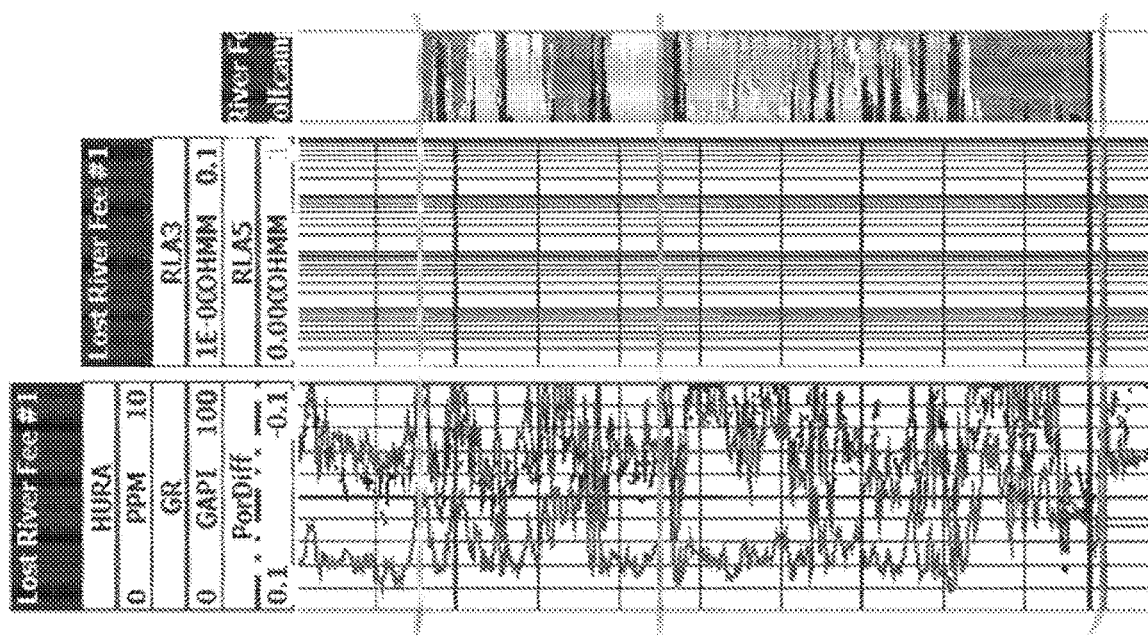

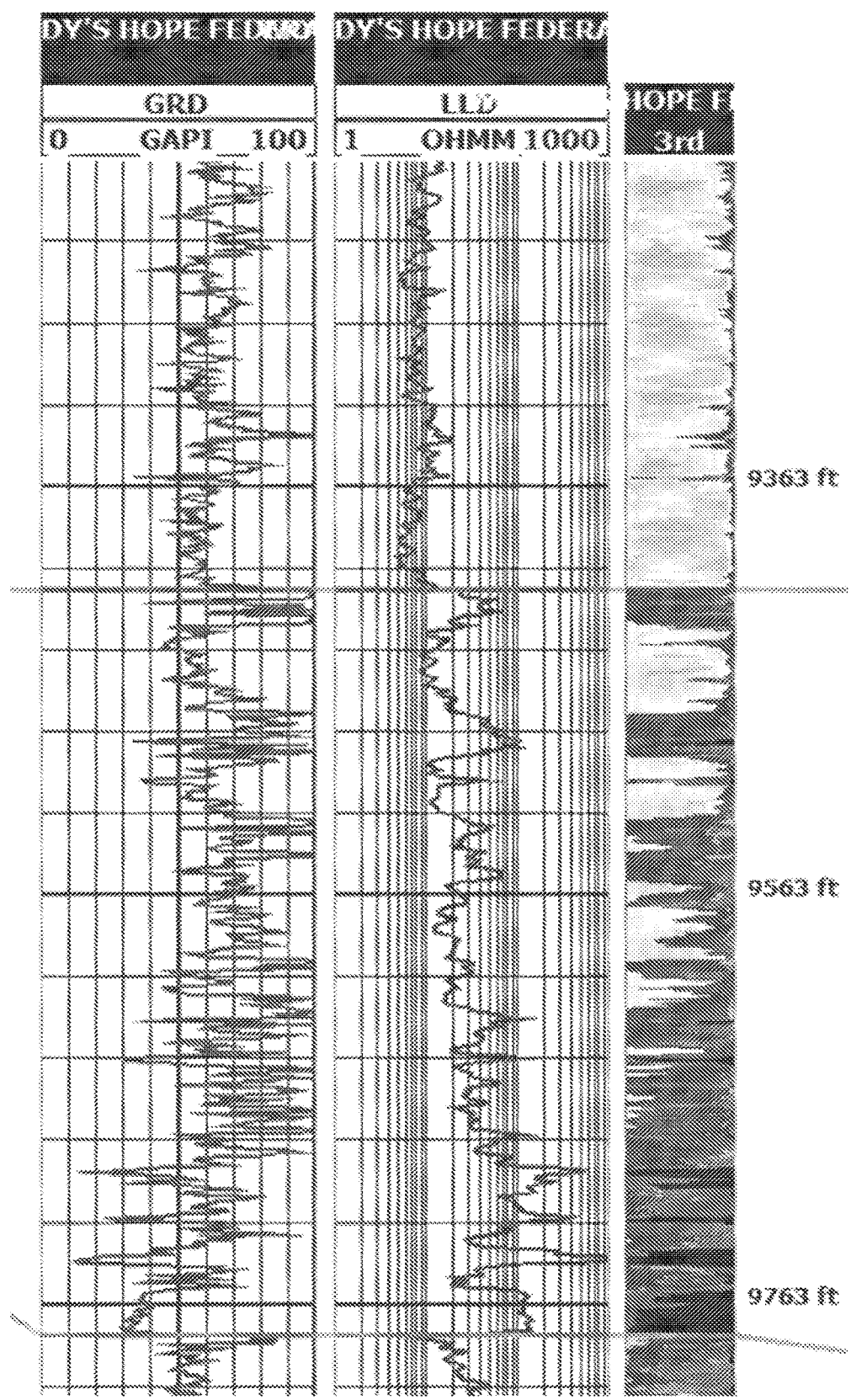
Fig. 8 (Cont. I)

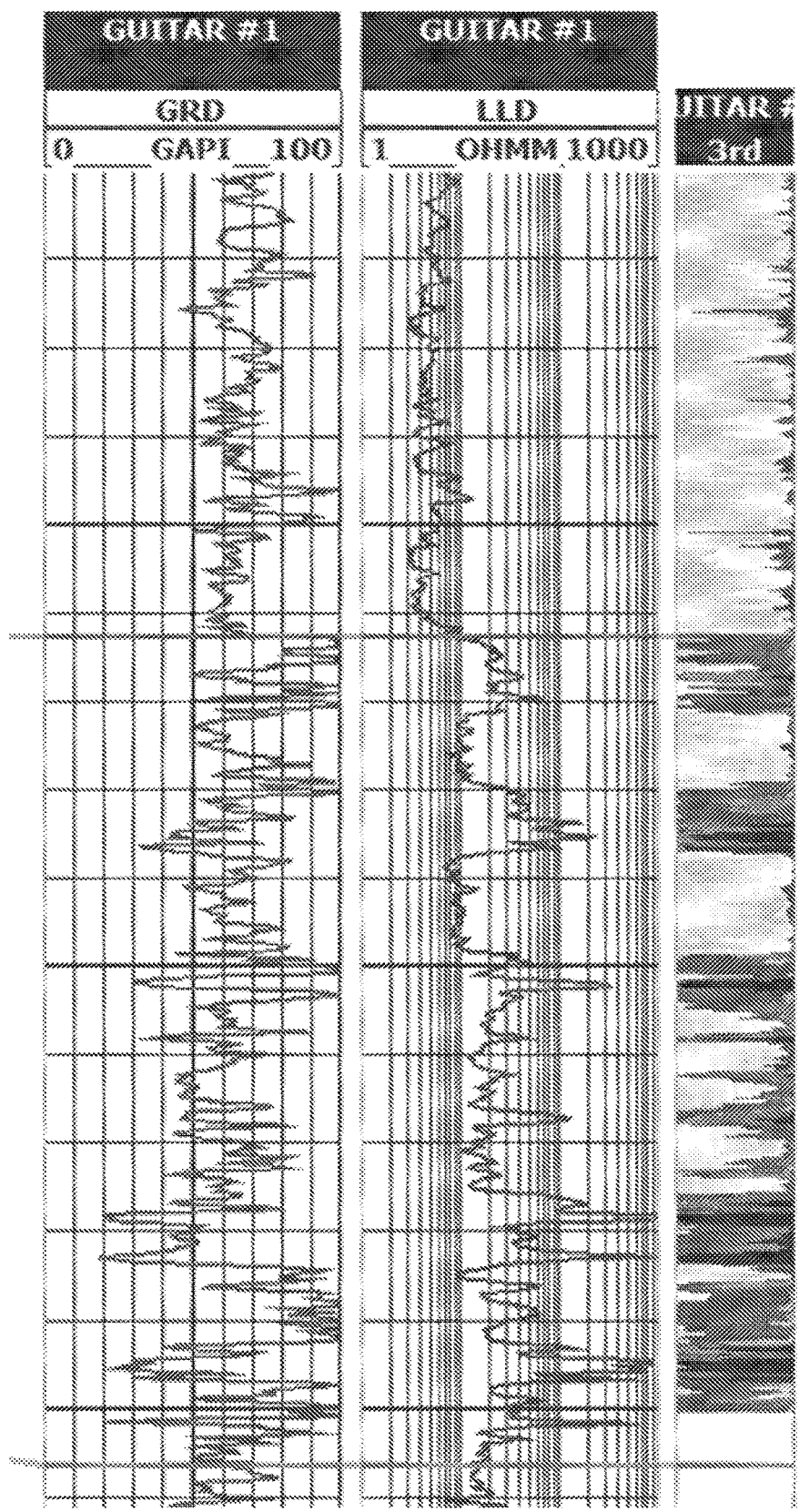
Fig. 8 (Cont. II)

USING BRINE RESISTANT SILICON DIOXIDE NANOPARTICLE DISPERSIONS TO IMPROVE OIL RECOVERY

CROSS-REFERENCE TO RELATED PATENT APPLICATIONS

This patent application is a continuation of U.S. patent application Ser. No. 16/179,676, filed Nov. 2, 2018, which claims priority to U.S. Provisional Patent Application No. 62/581,331, filed Nov. 3, 2017, the content of each of which is incorporated herein by reference in its entirety.

FIELD OF THE INVENTION

This invention is in the field of enhanced oil recovery using specialized fluids with additives.

BACKGROUND OF THE INVENTION

It is known to use Colloidal Silica Gels to improve oil reservoir fluid-flow control. See: "Oilfield Applications of Colloidal Silica Gel", by Jurinak and Summers, SPE Production Engineering, November 1991, ppgs 406-412. "Colloidal Silica" refers to stable aqueous dispersion of discrete nonporous particles of amorphous silicon dioxide ($SiO_2$). Concentrated commercial sols are stable at moderate pH and at high silicon dioxide/alkali ratios because of silica particle repulsion resultion from surface ionization in alkaline solution. Particle collision, bonding, and aggregation into long-chain networks are believed to cause colloidal silica to gel. Gelation occurs when particle aggregation ultimately forms a uniform 3D network of long, bead-like strings of silica particles. (page 406 of Jurinak and Summers). Gelled colloidal silica has been used in oil fields to plug pathways that the operator of the field wanted to shut off. Thus, it is known to created colloidal silica that will gel and remain gelled and use that in oil fields to block areas so that fluids cannot flow through those areas.

Since introducing nano-technology to the industry in the form of improved surfactant chemistry (see P. McElfresh, D. Holcomb, D. Ector; "Application of Nanofluid Technology to Improve Recovery in Oil and Gas Wells," SPE 154827, (2012).), technology has continued to advance, usually in the form of nano-emulsion surfactants for use in hydraulic fracturing operations.

It would be desirable to have a new nano-particle technology for the petroleum industry to showcase an economical method for improving initial producing rate, ultimate recovery, and overall project economics.

What is needed is a way to create and use colloidal silica sols that can enhance the flow of oil and gas through a hydrocarbon field.

SUMMARY OF THE INVENTION

The first aspect of the instant claimed invention is a method of extending an oil and gas system effective stimulated reservoir volume comprising the steps of adding a Brine Resistant Silicon Dioxide Nanoparticle Dispersion to conventional oil well treatment fluids.

The second aspect of the instant claimed invention is a method of increasing initial production rates of an oil well by over 20.0% as compared to wells either not treated with the Brine Resistant Silicon Dioxide Nanoparticle Dispersion technology or treated by conventional nano-emulsion surfactants comprising the steps of adding a Brine Resistant Silicon Dioxide Nanoparticle Dispersion to conventional oil well treatment fluids.

The third aspect of the instant claimed invention is the method of the first aspect of the instant claimed invention in which the pill volume is typically from about 500 to about 1,000 U.S. gallons of Brine Resistant Silicon Dioxide Nanoparticle Dispersion per about 3,000 to about 6,000 barrels (U.S.) of frac stage fluid.

The fourth aspect of the instant claimed invention is the method of the second aspect of the instant claimed invention in which the pill volume is typically from about 500 to about 1,000 U.S. gallons of Brine Resistant Silicon Dioxide Nanoparticle Dispersion per about 3,000 to about 6,000 barrels (US) of frac stage fluid.

The fifth aspect of the instant claimed invention is the method of the first aspect of the instant claimed invention, in which the order of addition of oil well treatment fluids to the well is as follows:
a) Adding the acid;
b) Adding the fresh water spacer;
c) Adding a BRINE RESISTANT SDND pill;
d) Adding a fresh water spacer and
e) Inserting the pad of the frac treatment.

The sixth aspect of the instant claimed invention is the method of the second aspect of the instant claimed invention in which the order of addition of oil well treatment fluids to the well is as follows:
a) Adding the acid;
b) Adding the fresh water spacer;
c) Adding a BRINE RESISTANT SDND pill;
d) Adding a fresh water spacer and
e) Inserting the pad of the frac treatment.

The BRINE RESISTANT SDND technology described and claimed in this patent application is revolutionary in the fact that it is not surfactant based but rather a Brine Resistant Silicon Dioxide Nanoparticle Dispersion ("BRINE RESISTANT SDND") based. However, due to the advanced physical processes associated with this technology, such as Brownian motion driven diffusion and disjoining pressure, the BRINE RESISTANT SDND results in many reservoir flow dynamics usually associated with the nano-emulsion surfactants, such as increased flowback of the fracture stimulation fluid. The BRINE RESISTANT SDND has been pumped in many different formations and basins across the U.S., including the Permian Basin (Midland and Delaware sub-basins), the DJ Basin, the Codell-Niobrara Shale, and the Bakken in the Williston Basin. Production data from all treated basins continue to show improved initial production rates verifying the chemistry as independent of lithology.

DETAILED DESCRIPTION OF THE INVENTION

Figure 1:
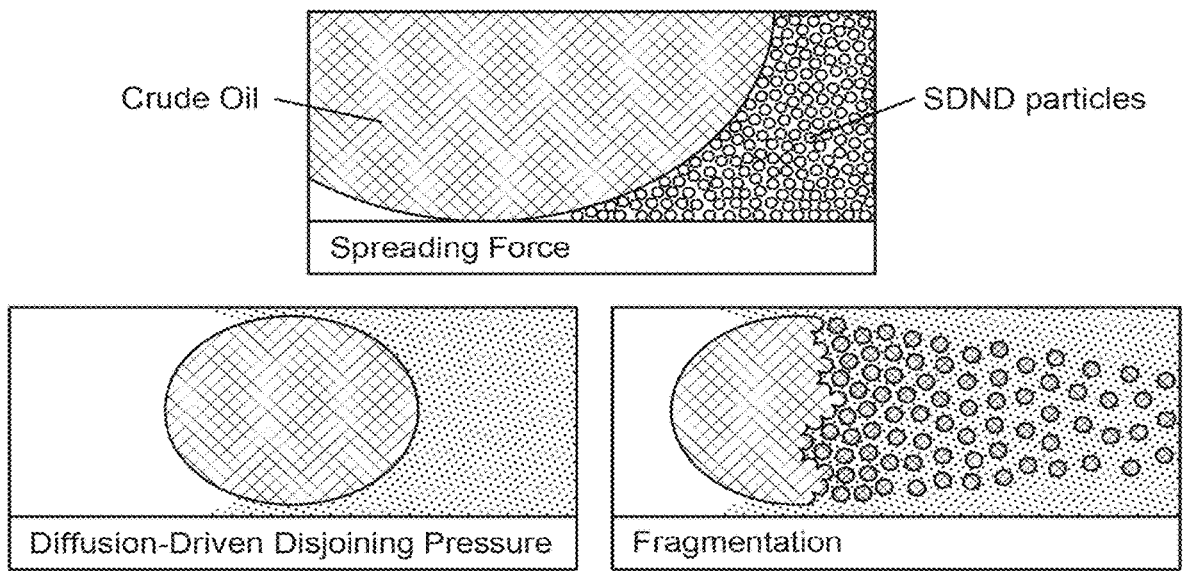
FIG. 1 illustrates the BRINE RESISTANT SDND Mechanism for Improved Hydrocarbon Recovery

Throughout this patent application the following abbreviations have the indicated meanings.

BOE Barrels of Oil, Equivalent, wherein one barrel of oil equivalent is the energy released through the burning of one barrel of oil. Because it can be used to express amounts of both oil and gas, the barrel of oil equivalent is commonly used in financial statements by fuel companies.

BPM Barrels per Minute, wherein an oil barrel is defined as 42 US gallons which is about 35 imperial gallons. In Canada, oil companies measure oil in cubic metres but convert to barrels on export, since most of Canada's oil production is exported to the U.S.

ESRV effective stimulated reservoir volume
IRR Internal Rate of Return, %
Mgal Gallons, Thousands
Mlbs Pounds, Thousands
Mscf Thousand Standard Cubic Feet
MMscf Million Standard Cubic Feet
MSTB Stock Tank Barrels, Thousands
NPV Net Present Value
ppg Pounds per Gallon BRINE RESISTANT SDND Brine Resistant Silicon Dioxide Nanoparticle Dispersion
STB Stock Tank Barrel
SPUD Make the Initial Drilling for an Oil Well
TVD True Vertical Depth, ft Colloidal Silica Nanoparticle dispersions provide a unique enabling mechanism to improve the efficiency of fluids and additives in the performance of their intended actions during several reservoir intervention applications. A wide range of applications for nanotechnology utilizing the mechanism of disjoining pressure have been investigated. The mechanism improves the removal of discontinuous phases such as oil, gas, damaging material like paraffin, polymer, biofilm, or scale from the rock substrate to improve production through nano- and micro-darcy fractures. Fluid systems can be specifically designed for each of these applications by selecting various particles, with or without surface modifications, or with alterations to the ionic nature of the carrier fluid.

This patent application is intended not only to introduce and explain a new nano-particle technology to the petroleum industry but to showcase an economical method for improving initial producing rate, ultimate recovery, and overall project economics.

The key component of the new nano-particle technology is "brine-resistant colloidal silica".

Colloidal silica is known to be electrostatically stabilized by surface charge, where like charges at the silica particle surface repel the like charges of other particles leading to a stable dispersion—this is part of the definition of a colloidal dispersion. In briny water, where the water/dispersant contains dissolved salt ions, colloidal particles experience a disruption or shielding of particle surface charge leading to a reduction in particle-to-particle repulsion and reduced colloidal stability.

It is known to surface-treat colloidal silica to try to avoid the loss of stability caused when the colloid encounters disruptive conditions, such as brine. However, it is known that some surface treated silica is more brine resistant than others.

With regards to brine resistance of colloidal silica, it is believed without being bound thereby, that the hydrophilicity/hydrophobicity of the surface treatment is important as well as the amount of surface treatment relative to the available silica surface area.

Organic surface treatment can improve colloidal silica stability in brine/high salinity water by addition of steric repulsion properties to supplement electrostatic repulsion between particles. Hydrophilic organic surface treatment is somewhat effective at adding this steric repulsion property for improved brine resistance. A combination of Hydrophilic and Hydrophobic surface treatment in the correct proportion can also form highly brine resistant surface treatment systems for colloidal silica—this is a necessity for the success of the described invention.

Adding some Hydrophobic character to colloidal silica is known in Organic solvent systems. However, this is difficult to achieve in Aqueous systems. This is because, hydrophobic character by definition is water-hating and not prone to solubility or stability in water. It is desirable in this work to add organic surface treatment to colloidal silica having a combination of Hydrophilic and Hydrophobic character—where the silica has both excellent brine stability and the ability to perform well in removing oil from rock surfaces. Combining Hydrophilic and Hydrophobic character is well known in surfactant science but is not well known in organic surface treatment for colloidal silica.

Some surface-treated colloidal silica for use downhole is not suitable in this invention. A repeated example from U.S. Pat. No. 7,033,975 assigned to 3M Innovative Properties Ltd., using the described surface treatment material and method, was not stable in water due to what is believed to be excessive Hydrophobic character. In the 3M patent continued stability of the colloidal silica sol was not a desired property. The silicasol in the described 3M example was dried after synthesis and the resulting powder was used as an additive to make a foam. Brine stability and colloidal silica stability were not a targeted property of the described example. In recreating the example it was found that the colloidal silica was not even stable in water after surface treatment due to excessive Hydrophobic character of the surface treatment and thus would be even less stable in brine than pure water. Our invention requires both stability after synthesis and also stability in contact with brine.

Recently, the stimulation of several Wolfcamp and Bone Springs targeted wells in the northern Delaware Basin using fracturing treatments and a new method employing relatively small pre-pad pill volumes of colloidal silica nanoparticle dispersions ahead of each stage of treatment have been successfully performed. The liquid colloidal silica nanoparticle dispersion pre-pad pills used in each stage consist of highly surface modified, neutral wet colloidal silica nanoparticles dispersed in small water volumes which penetrate the reservoir's natural fracture and secondary induced fracture network via accelerated diffusion into the reservoir beyond the primary induced fracture network, producing a Brownian motion activated, mechanical advantage process known as disjoining pressure.

These neutral wet, solid colloidal silica nanoparticles aid in delivering improved efficacy in the recovery of hydrocarbons via counter-current imbibition by fragmenting the disjoined oil into smaller oil droplets, enabling a more efficient backflow to the propped fracture network and back to the wellbore. The colloidal silica nanoparticle dispersion pre-pad pills are used to introduce the colloidal silica nanoparticle dispersion farther into the reservoirs naturally fractured/permeable matrix network and employ the mechanisms described above to enhance and sustain the mobility of hydrocarbons (overcome confining capillary pressures) back to the propped facture network and subsequently to the wellbore.

Advantages of this method and mechanical process are the ability to access the reservoir beyond where proppants can be placed thereby improving the effective stimulated reservoir volume. The evaluation of results in these zones has shown that utilizing the colloidal silica nanoparticle pre-pad pills has resulted in significantly improved performance, 20-30 percent higher than the best available technology, as compared to over 15 offset wells when normalized with respect to stimulation and production techniques and procedures. The results include significantly higher oil cuts for a longer sustained time periods as well as providing earlier oil to surface after treatment flowback and continued flowing production before requiring artificial lift implementation. While the number of offset wells is greater than nanoparticle dispersion treated wells, the results clearly demonstrate that there is a positive impact as well as persistent improvement factor (EUR) from using the pre-pad colloidal silica nanoparticle dispersion pills ahead of each stage.

Colloidal silica nanoparticle dispersions provide a unique enabling mechanism to improve the efficiency of fluids and additives in the performance of their intended actions during several reservoir intervention applications. A wide range of applications for colloidal silica nanotechnology utilizing the mechanism of disjoining pressure have been investigated. The mechanism improves the removal of discontinuous phases such as oil, gas, damaging material like paraffin, polymer, biofilm, or scale from the rock substrate to improve production through nano- and micro-darcy fractures. Fluid systems can be specifically designed for each of these applications by selecting various particles, with or without surface modifications, or with alterations to the ionic nature of the carrier fluid.[1]

Brine Resistant SDND Technology Synopsis

The key to this new technology consists of aqueous BRINE RESISTANT SDND treatments during the fracture stimulation treatments. The technology is applied using pre-pad pills, consisting of 500-1,000 US gallons of BRINE RESISTANT SDND per 3,000-4,000 barrels (US) of stimulation fluid.

The BRINE RESISTANT SDND consists of highly surface modified, neutral wet colloidal silica nano-particles dispersed in small water volumes which penetrate via accelerated diffusion into the reservoir beyond the induced fracture network. This process produces a Brownian motion activated, mechanical process known as disjoining pressure. These neutral wet, solid colloidal silica nanoparticles aid in delivering improved efficacy in the recovery of hydrocarbons via counter-current imbibition from the reservoir, by fragmenting the disjoined oil into smaller oil droplets, enabling a more efficient backflow to the propped and/or the induced secondary fracture network. This is especially beneficial when dealing with nano- and micro-darcy permeability fractures. The process of fragmentation follows diffusion and disjoining pressure. After diffusing into more of the natural and secondary fracture network, then disjoining hydrocarbons from surfaces, BRINE RESISTANT SDND creates and surrounds small droplets of hydrocarbon thus enabling more efficient countercurrent flow through and from porous media and natural fractures into propped fractures and/or directly to the wellbore. These three mechanisms subsequently contribute to improve hydrocarbon recovery due to significantly enhanced hydrocarbon flow from greater stimulated reservoir volume.[5]

Nanoparticles in an aqueous dispersion (BRINE RESISTANT SDND) will assemble themselves into structural arrays at a discontinuous phase such as oil, gas, paraffin, or polymer (see D. T. Wasan, A. D. Nikolov; "Spreading of Nanofluids on Solids," (2003), Nature, Vol. 423: 156-159.). The particles that are present in this three-phase contact region tend to form a wedge-like structure and force themselves between the discontinuous phase and the substrate as depicted in FIG. 1. Particles present in the bulk fluid exert pressure forcing the particles in the confined region, imparting the disjoining pressure force. The energies that drive this mechanism are Brownian motion, and electrostatic repulsion between the particles. The force imparted by a single particle is extremely weak, but when large amounts of small particles are present, referred to as the particle volume fraction, the force can be upwards of 50,000 Pa (7.25 psi) at the 3-phase contact angle/vertex. While the pressure appears to be quite low, it is extremely high relative to the particle volume fraction.

Particle size and the associated particle charge density as wells as particle volume fraction, also affect the strength of this force. The smaller the particle size, the higher the charge density, and the larger the electrostatic repulsion between those particles. When this force is confined to the vertex of the discontinuous phases, displacement occurs in an attempt to regain equilibrium. As with any colloid system, particle size, temperature, salinity of the carrier fluid, and the surface characteristics of the substrate also affect the magnitude of the disjoining force. BRINE RESISTANT SDND accounts for these phenomena.

Figure 2:
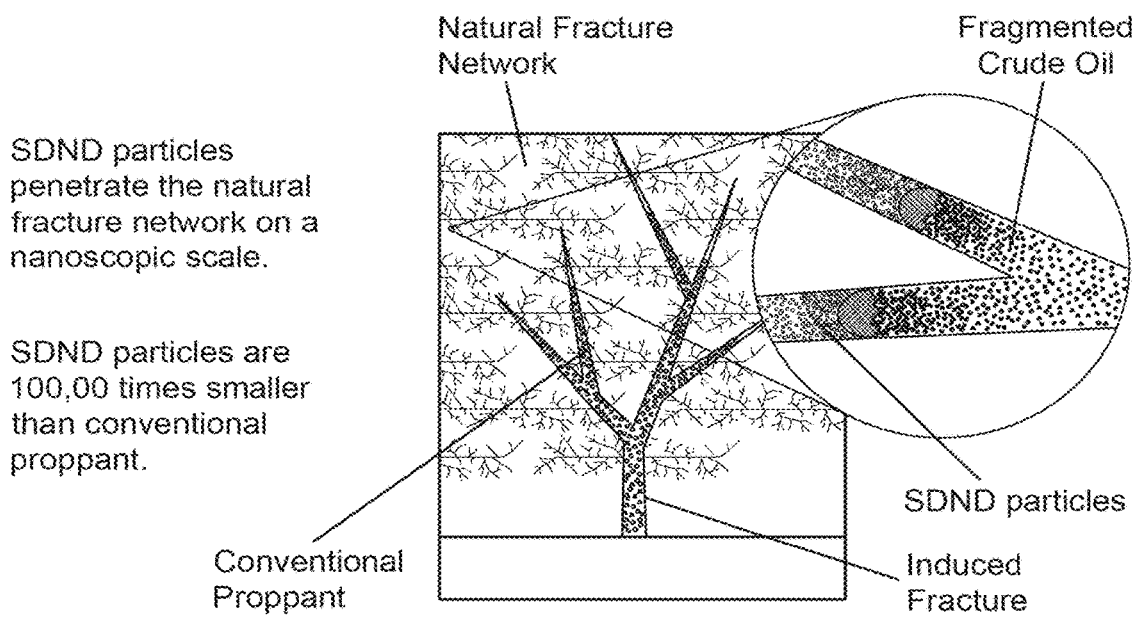
FIG. 2 illustrates BRINE RESISTANT SDND Fracture Network Extension

It is proposed that the BRINE RESISTANT SDND pre-pad/pills are introduced farther into the naturally fractured/permeable matrix network of the reservoir and uses the mechanisms described above to enhance and sustain the mobility of hydrocarbons back to the propped fracture network and subsequently to the wellbore. BRINE RESISTANT SDND particles penetrate the natural fracture network on a nanoscopic scale as shown in FIG. 2. The extension into the natural fracture network is possible due to the abundance and more importantly, the size of the individual particles, which average less than 20 nanometers in diameter. Advantages of this method and mechanical process are the ability to access the reservoir beyond where proppants can be placed thereby improving the effective stimulated reservoir volume (ESRV).

The BRINE RESISTANT SDND is pumped as a pre-pad pill, eliminating the need to include the chemistry on a continuous basis throughout stimulation treatment. The volume of BRINE RESISTANT SDND required for each formation, well type, and stage is engineered depending upon relevant formation fluid and rock parameters, such as net pay, water saturation and chemistry, oil and gas gravity, paraffin content, gas-oil ratio, natural fracture density, reservoir pressure and temperature. The BRINE RESISTANT SDND appears to be very cost competitive compared to many high-end micellar or nano-type surfactant and solvent systems currently in use. The design of each treatment is explained in further detail later in this patent application.

EXAMPLES

A trial program consisting of initially 5 wells was implemented with a Permian Basin operator to test the feasibility of increasing initial production and ultimate recovery of three different ultra-low permeability reservoirs. All five wells are in Eddy and Lea Counties, N. Mex. which is within the Delaware sub-basin. The Case Study wells included the Wolfcamp B, Wolfcamp X-Y Sand, and $2^{nd}$ and $3^{rd}$ Bone Spring formations. In all cases, the operator observed increases in the initial actual production rates versus the predicted type curve performance. In addition, the percent oil cuts on each well increased with water production rates falling after fracture cleanup, which further enhanced the project economics.

Figure 3:
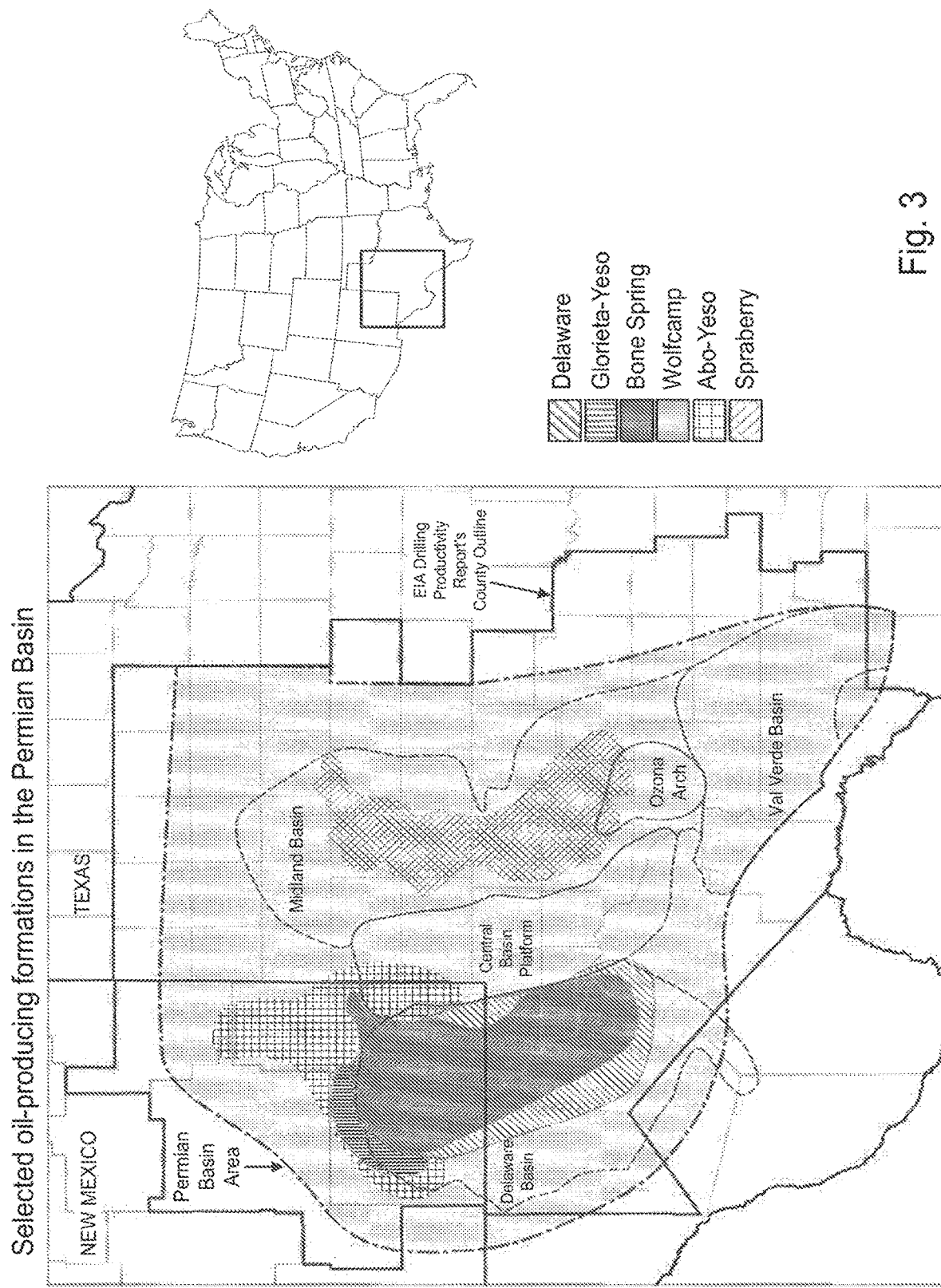
FIG. 3 illustrates a Map showing the Location of the Greater Permian Basin and Major Producing Formations
Figure 4:
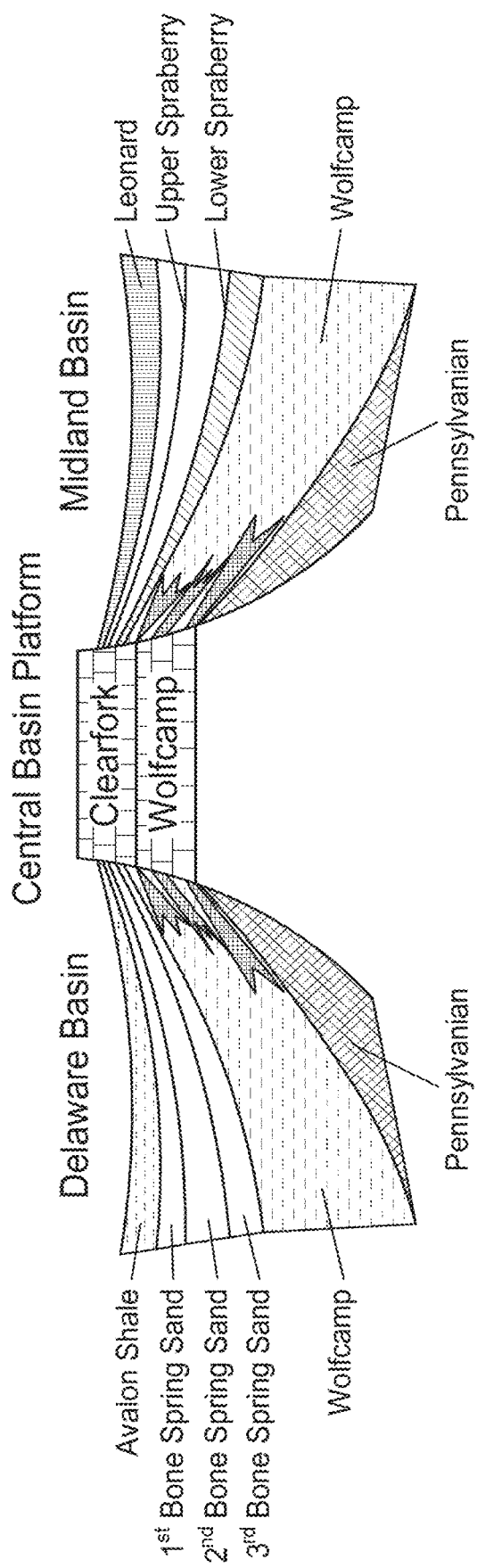
FIG. 4 illustrates a Permian Basin Geologic Cross-Section

The Permian Basin, shown in FIG. 3, is a sedimentary basin largely contained in the western part of Texas (surrounding the Midland/Odessa area) and the southeastern part of New Mexico (mainly in Lea and Eddy Counties). It is so named because it has one of the world's thickest deposits of formation strata from the Permian geologic period. The greater Permian Basin is made up of several component basins including the Midland Basin (which is the largest), the Delaware Basin (which is the second largest), and the Marfa Basin (which is the smallest). FIG. 4 is a schematic of the Permian Basin showing the main formations associated with the Delaware Basin, the Central Platform, and the Midland Basin. The Permian Basin extends beneath an area approximately 250 miles (400 km) wide and 300 miles (480 km) long.

Delaware Basin

The Delaware Basin is the largest lobe of the two major lobes of the Permian Basin within the foreland of the Quachita-Marathon thrust belt separated by the Central Basin Platform. The basin contains sediment from the Pennsylvanian, Wolfcampian, Leonardian, and early Guadalupian times. The Geologic Periodic Table showing the Delaware Basin Stratigraphic Formations within their associated period and epochs is shown in Table 1.

TABLE 1

Delaware Basin Stratigraphic Formations

| Period | Epoch | Series | Formation |
| --- | --- | --- | --- |
| Permian | Guadalupian | Delaware Group | Lamar Bell Canyon |
| | | | Cherry Canyon |
| | | | Brushy Canyon |
| | Leonardian | | Upper Avalon Shale |
| | | | Lower Avalon Shale |
| | | | $1^{st}$ Bone Spring |
| | | | $2^{nd}$ Bone Spring |
| | | | $3^{rd}$ Bone Spring |
| | Wolfcampian | | Wolfcamp |
| | Pennsylvanian | | Pennsylvanian |

The eastward dipping Delaware basin is subdivided into several formations and contains approximately 25,000 feet (7,600 m) of laminated siltstone, sandstone, and shale. Aside from clastic sediment, the Delaware basin also contains non-clastic carbonate deposits originating from the Guadalupian times when the Hovey Channel allowed access from the sea into the basin.[7]

The Delaware Basin stratigraphy, especially Leonardian aged strata, is different from the Midland Basin. Where the Midland has the Spraberry and Dean formation, the Delaware has the Bone Spring and Avalon formations. Similarly, both sub-basins have common Wolfcamp formations that are very analogous. Just like the Midland, these two stratigraphic plays have been combined to be dubbed the "Wolfbone". The deeper Delaware Basin is also a multi-stacked play area similar to the Midland Basin.

Bone Spring Formation

Figure 5:
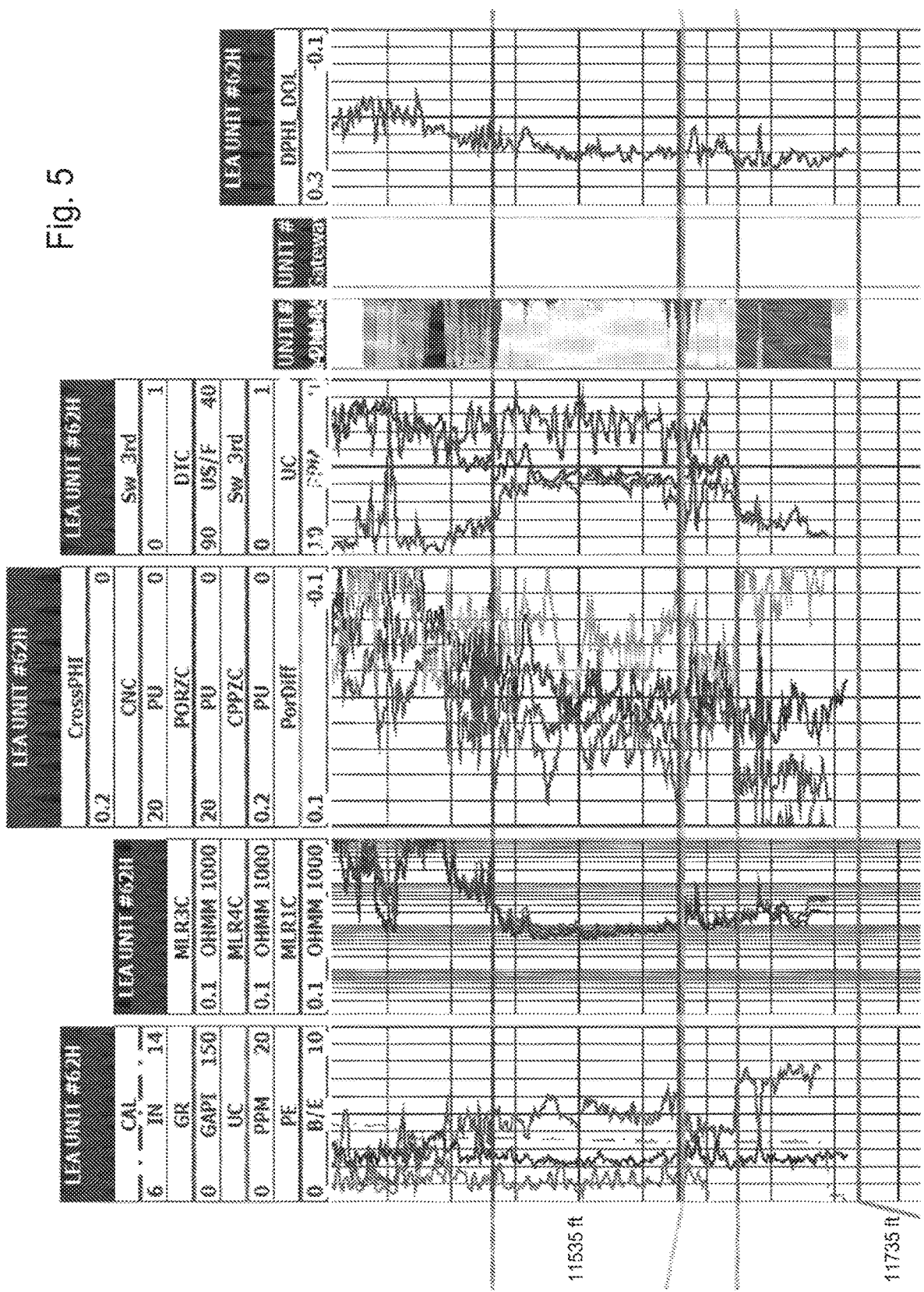
FIG. 5 shows a Cross-Section of the $3^{rd}$ Bone Spring, Lea County, N. Mex.

The Bone Spring formation is Leonardian in age and is divided into the 1st, 2nd, and 3rd Bone Spring, each containing a package of carbonate followed by a package of sand. This cyclic sedimentation is due to the change in sea level as mentioned above, where the carbonate is formed when sea level was at a high and sands when the sea level was at a low. Above the 1st Bone Spring carbonate, there are the upper and lower Avalon shales as well as the Avalon carbonate that splits the two shales. The sand intervals of the Bone Spring are composed of dark, thinly bedded, calcareous shales and siltstones. The entire Bone Spring and Avalon formations (often just called the Bone Spring) average in thickness from 2,500 feet to 3,500 feet. The thickest region of the formation occurs in the eastern portion of the Delaware Basin before it quickly disappears into the Central Basin Platform. A cross section of the $3^{rd}$ Bone Spring formation is shown in FIG. 5, located near the case study area in Lea County, N. Mex.

Wolfcamp Formation

The Wolfcamp formation in the Delaware Basin is an ideal heterogenetic resource of hydrocarbons. While the lithology of the Delaware Wolfcamp is analogous to the Midland Wolfcamp, characterized by interbedded shale and limestone, some differences do occur. In fact, the same Wolfcamp formation in the northwestern section of the Delaware basin is different from the rest of the basin's Wolfcamp. In the northwestern portion of the basin, the Wolfcamp's carbonates are light colored dolostones. In contrast, the rest of the basin's Wolfcampian strata are dark colored lime packstones, wackestones, siltstones, and mudstones. The depths and thickness of the Delaware Wolfcamp also differ from the Midland Wolfcamp. It has an average thickness of 2,000 feet but can locally exceed 6,000 feet in the western portion of the basin. The top of the Wolfcamp in the Delaware Basin lies on an average depth ranging from 10,000 to 12,000 feet.

Figure 6:
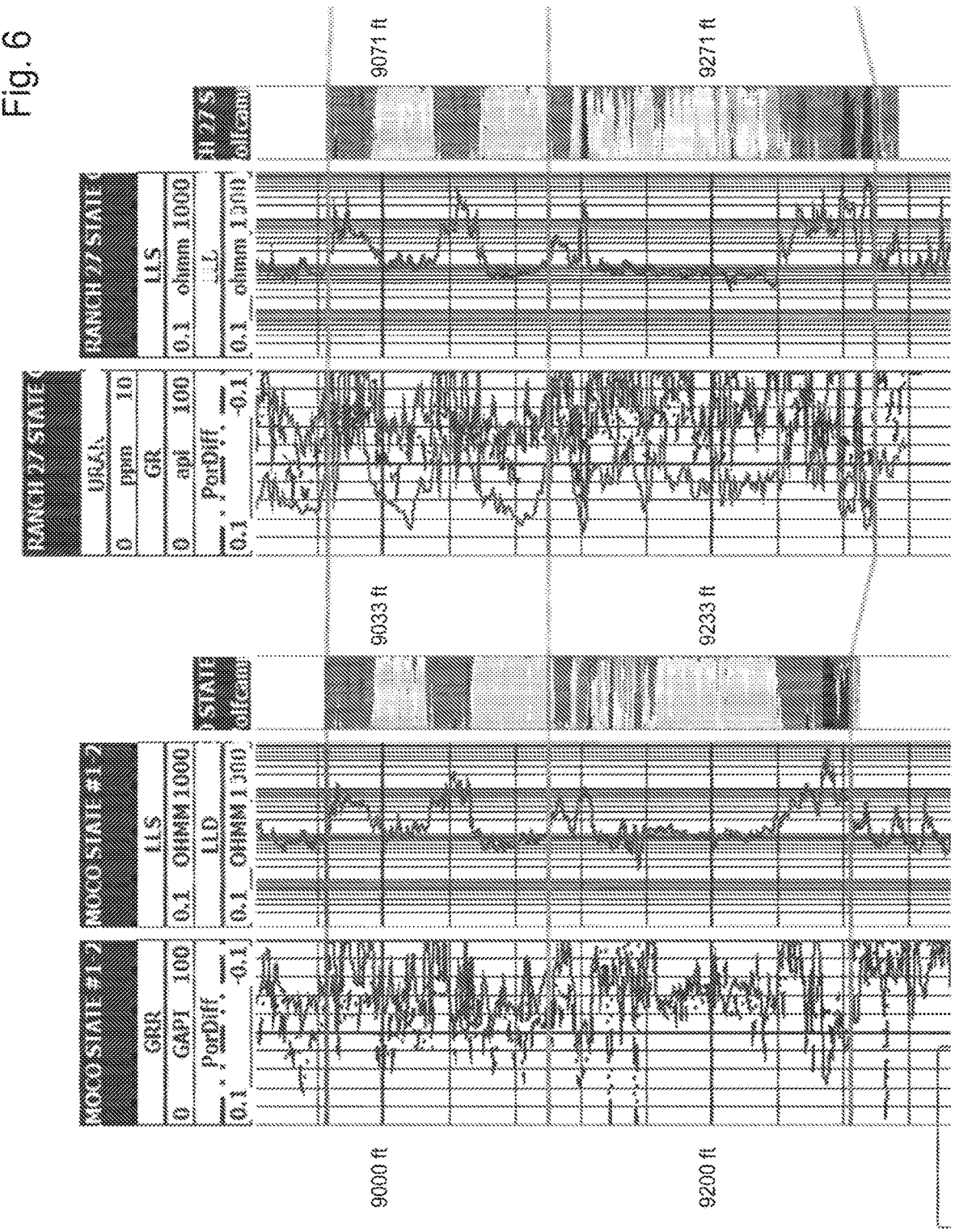
FIG. 6 shows a Cross-Section of the Top of Wolfcamp Formation, Eddy County, N. Mex.
Figure 7:
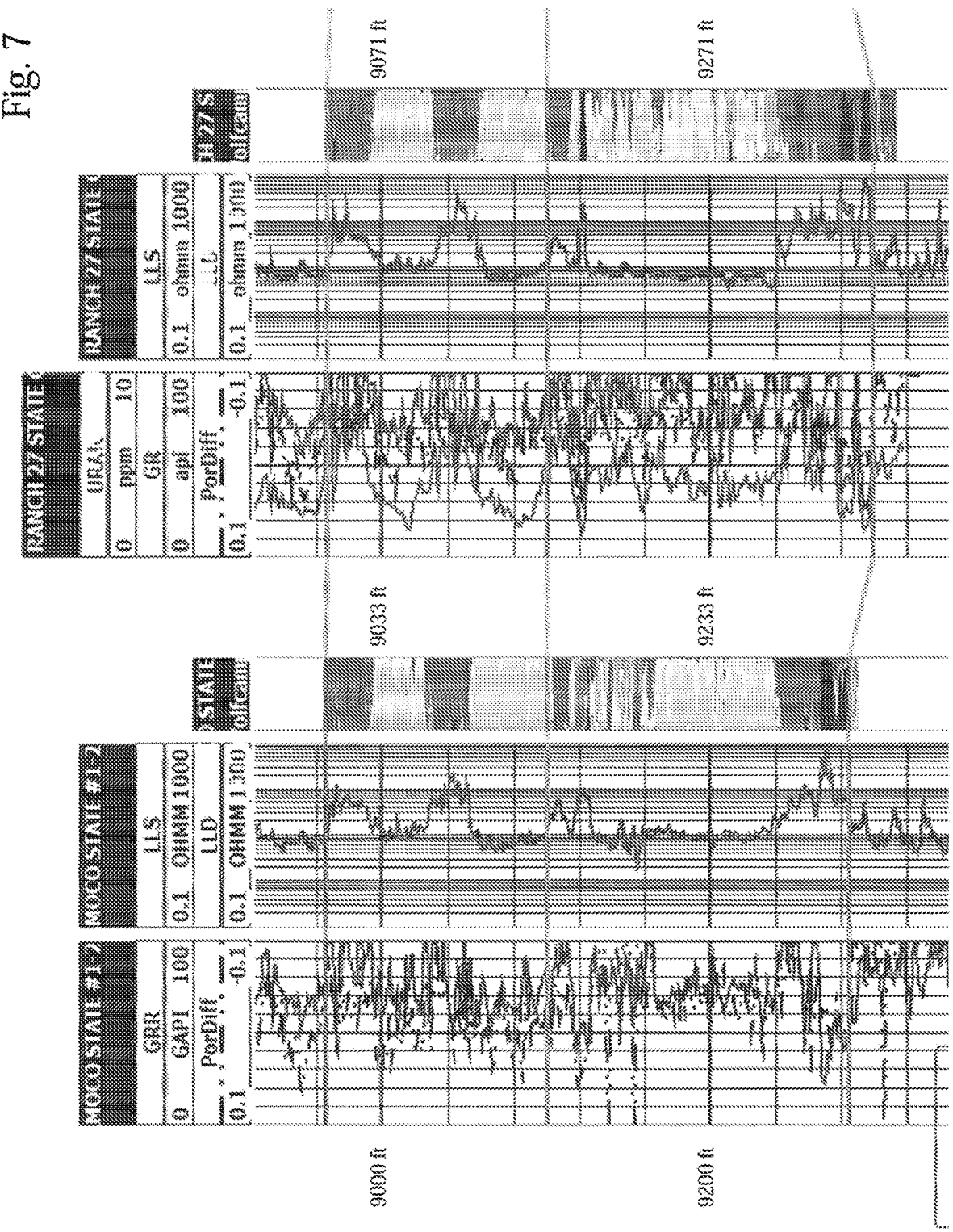
FIG. 7 shows a Cross-Section of the Top of Wolfcamp X-Y Formation, Eddy County, N. Mex.
Figure 8:
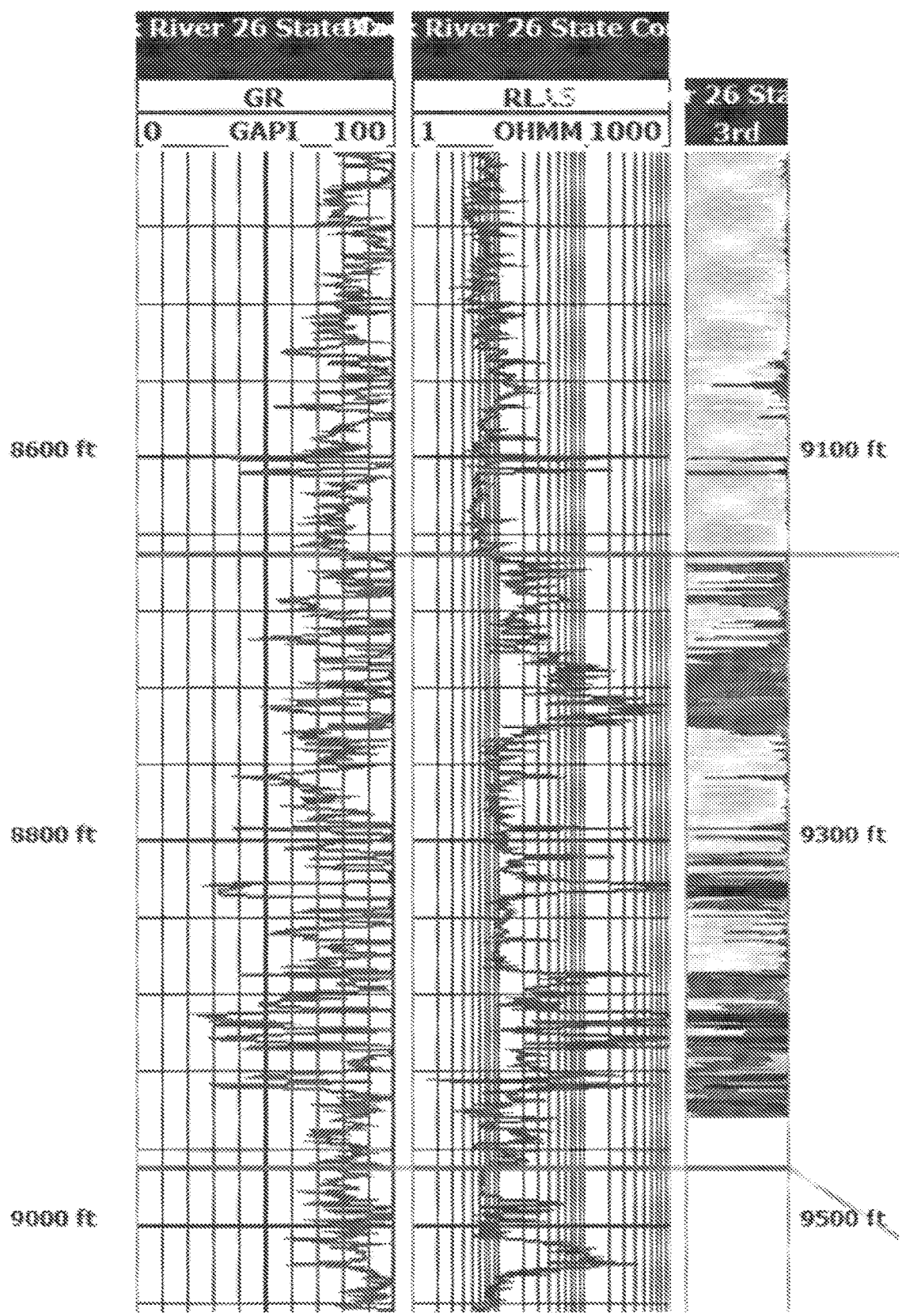
FIG. 8 shows a Cross-Section of the Top of Wolfcamp B Formation, Eddy Country, N. Mex.

FIGS. 6, 7, and 8 depict cross-sections of the top of the Wolfcamp formation, the Wolfcamp X-Y formation, and the Wolfcamp B formations, respectively. All three cross sections are in the Case Study area in Eddy County, N. Mex.

The amount and concentration of the BRINE RESISTANT SDND pill needed for each well stimulation is engineered for each well and stimulation treatment, dependent on many factors. Treatment fluid volume and reservoir fluid chemistry, along with the amount and type of proppant being pumped are primary factors when considering the economics of the treatment. Basic characteristics of the formation and reservoir fluids also need to be evaluated such as net pay, water saturation and chemistry, oil and gas gravity, paraffin and asphaltene content, gas-oil ratio, natural fracture density, pressure and temperature.

The key to the technology surrounds the importance of delivering sufficient amounts of nanoparticles while staying within an economic environment with respect to well costs. Based on dozens of jobs performed at the time of filing this patent application, the BRINE RESISTANT SDND technology is usually very cost competitive when compared to many high-end micro or nano-type surfactant systems currently in use. The colloidal silica nanoparticles, due to their size (12-20 nanometers in diameter), overwhelm the contacted reservoir surface area (matrix porosity and natural fracture network). The physics associated with the BRINE RESISTANT SDND technology then displace hydrocarbons and water via counter-current imbibition.

The pill volume, in most naturally-fractured unconventional formations, is typically 500-1,000 U.S. gallons of BRINE RESISTANT SDND per 3,000-6,000 barrels (U.S.) of frac stage fluid. Lighter density (higher API gravity) hydrocarbons will need lower concentrations and volumes of BRINE RESISTANT SDND pills to effectively fragment and remove oil from the reservoir whereas higher density (low API gravity) hydrocarbons will need higher concentrations and volumes of BRINE RESISTANT SDND pills. Natural gas is more easily removed by BRINE RESISTANT SDND's however water can be a primary inhibitor in the movement of natural gas to the propped fracture. BRINE RESISTANT SDND avoids mobilizing water allowing natural gas to move more readily. The BRINE RESISTANT SDND works in order of specific gravity therefore will counter-currently imbibe and flow in the order of natural gas, light oils, heavy oils, paraffin then water.

Chemical composition of the reservoir fluids may make it desirable and/or necessary to pump a standard non-emulsifier as part of the fracture fluid chemistry. However, it may no longer be necessary to pump other state of the art surfactant-based additives.

The placement of a BRINE RESISTANT SDND pill in a new well fracture stimulation is typically behind the acid stage (if present) and ahead of the pad of the frac treatment. It is recommended the BRINE RESISTANT SDND be accompanied by fresh water spacers run ahead and behind the BRINE RESISTANT SDND pill volume, which are typically 1,000-2,000 gallons. The fresh water spacers are to be pumped without chemical additives to effectively deliver the highest volume of nanoparticles into the formation by eliminating competition with other chemical additives. The spacers also limit the reaction of the BRINE RESISTANT SDND with competing chemistries to provide the most nanoparticles to contact the formation surfaces within the matrix porosity and fracture networks.

By placing the pill ahead of the main body of the fracture treatment, the main frac treatment acts as a "hydraulic ram" pushing the BRINE RESISTANT SDND deep into the formation's matrix and natural fracture network. During this process, the BRINE RESISTANT SDND is affecting the contacted rock surfaces while also counter-currently imbibing or back-filling, into the fracture treatment. Table 2 illustrates the typical fluid sequence for placing of a BRINE RESISTANT SDND pill in a fracture treatment. Injection begins then acid is placed to etch and breakdown the cement sheath between the casing and formation. The acid can be flushed through the perforations or a spacer can be placed between the acid and BRINE RESISTANT SDND pill. An adequate volume of spacer should be pumped to ensure the acid is spent. This volume of initial spacer will depend on the formation solubility and strength of acid used. It is also recommended the spacers and BRINE RESISTANT SDND pill be pumped independent of the frac pumping equipment. This will improve the effectiveness of the BRINE RESISTANT SDND pill by keeping it concentrated and reduce contamination. A BRINE RESISTANT SDND pill along with spacers can also be pumped in the middle of a treatment or after a diverter should treatment volumes be larger than 8,000 barrels.

Brine Stability Testing

After creation, a colloidal silica is tested to see if it is brine stable because brine stability is a requirement for use in an oil and gas field. These are the test methods followed when testing colloidal silica to determine whether it is brine resistant:

API Brine by Visual Observation:

A 10 wt % API Brine solution is prepared by dissolving 8 wt % NaCl (SigmaAldrich) and 2 wt % $CaCl_2$ (Sigma Aldrich) in distilled water. Testing for Brine resistance is done by placing 1 gram of example silica sol into 10 grams of API Brine Solution. Stability observations are performed at standard brine exposure periods of 10 minutes and 24 hours. These observations include the clarity and transparency of the silica sol. The results of these observations are recorded at these times. Silica sol solutions that are stable to Brine exposure will remain clear and transparent/opalescent while unstable examples become visibly hazy and opaque after brine exposure.

Artificial Seawater by Visual Observation

Artificial seawater is prepared by dissolving Fritz Pro Aquatics RPM Reef Pro Mix (Fritz Industries, Inc.) at 6 wt % in distilled water. Testing for Brine resistance is done by placing 1 gram of example silica sol into 10 grams of Artificial Seawater. Stability observations are performed at standard brine exposure periods of 10 minutes and 24 hours. These observations include the clarity and transparency of the silica sol. The results of these observations are recorded at these times. Silica sol solutions that are stable to Brine exposure will remain clear and transparent/opalescent while unstable examples become visibly hazy and opaque after brine exposure.

API Brine Resistance Test by Use of a Turbidimeter

Reference: US EPA 180.1 Determination of Turbidity by Nephelometry

A difference between this test and the US EPA 101.1 test is that in this test, step 11.2 is not followed:

Step 11.2 reads as follows: Turbidities exceeding 40 units: Dilute the sample with one or more volumes of turbidity-free water until the turbidity falls below 40 units. The turbidity of the original sample is then computed from the turbidity of the diluted sample and the dilution factor.

For example, if 5 volumes of turbidity-free water were added to 1 volume of sample, and the diluted sample showed a turbidity of 30 units, then the turbidity of the original sample was 180 units.

For this work, the actual ("raw") value of turbidity is recorded, whether it is above, below or equal to 40.

Test solutions/surface treated silicasols are tested for Brine resistance by Turbidimetry.

A calibrated Hach 2100AN Turbidimeter is used to measure Turbidity in units of NTU (Nephelometric Turbidity Units).

Test solution amounts of 3.0 g are placed into standard turbidity test tubes of approximately 30 ml.

Twenty-seven grams (27 g) of 10% API brine (8 wt % NaCl, 2 wt % $CaCl_2$)) are added to the test tube and the mixture inverted three times to mix test solution and brine. Test solution concentrations are therefore 10 wt % in API Brine.

Sample test tubes are inserted into the Turbidimeter and an initial measurement of turbidity is taken immediately, followed by a turbidity measurement after 24 hours.

A change in turbidity of more than 100 NTU leads to the conclusion that the silica sol is not brine stable. Conversely a change in turbidity of less than 100 NTU after API brine exposure leads to the conclusion that the silica sol is brine stable Examples of Brine Resistant Colloidal Silica Sols In the following potential examples, each ingredient that is used to create a surface treated colloidal silica, is listed as Parts of Ingredient, per 100 parts of surface treated colloidal silica.

ST-O25 and ST-32C are commercially available colloidal silicas from Nissan Chemical America Corporation, located at 10333 Richmond Avenue, Suite 1100 Houston, Tex. 77042 or from Nissan Chemical Corporation, located at 5-1, Nihonbashi 2-Chome, Chuo-ku, Tokyo 103-6119, Japan.

| Ingredients | Examples | | | | | |
|---|---|---|---|---|---|---|
| | 1 | 2 | 3 | 4 | 5 | 6 |
| ST-O25 | 76 | 76 | 76 | 76 | 76 | 76 |
| Deionized water | 11.1 | 11.1 | 11.1 | 11.1 | 11.1 | 11.1 |
| Propylene Glycol | 10 | 10 | 10 | 10 | 10 | 10 |
| 3-(Triethoxysilyl)propyl Succinic Anhydride | 2.9 | | | | 1.9 | 1.9 |
| N-(Triethoxysilylpropyl)-O-Polyethyleneoxide Urethane | | 2.9 | | | | |
| Silane, trimethoxy[3-(oxiranyl methoxy)propyl] | | | 2.9 | | | |
| 3-Ureidopropyl Triethoxysilane | | | | 2.9 | | |
| 2-(3,4 epoxycyclohexyl)-ethyltrimethoxysilane | | | | | 1 | |
| 3-(Trimethoxysilyl)propyl Methacrylate | | | | | | 1 |
| Total | 100.00 | 100.00 | 100.00 | 100.00 | 100.00 | 100.00 |

| Ingredient | Examples | | | | | | |
|---|---|---|---|---|---|---|---|
| | 7 | 8 | 9 | 10 | 11 | 12 | 13 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| 3-(Triethoxysilyl)propyl Succinic Anhydride | 1.9 | 1.9 | 1.9 | 1.9 | 1.9 | 1.9 | 1.9 |
| Hexamethyl Disiloxane | 1 | | | | | | |
| Hexamethyl Disilazane | | 1 | | | | | |
| Trimethoxy Methyl Silane | | | 1 | | | | |
| Trimethoxy Phenyl Silane | | | | 1 | | | |
| Vinyl Trimethoxysilane | | | | | 1 | | |
| 3-(N,N-Dimethyl-aminopropyl)-Trimethoxysilane | | | | | | 1 | |
| 3-(Diethylamino)propyl trimethoxysilane | | | | | | | 1 |
| Total | 100 | 100 | 100 | 100 | 100 | 100 | 100 |

| Ingredient | Examples | | | | | | | |
|---|---|---|---|---|---|---|---|---|
| | 14 | 15 | 16 | 17 | 18 | 19 | 20 | 21 |
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Propylene Glycol | 10 | 10 | 10 | 10 | 10 | 10 | 10 | 10 |
| 3-(Triethoxy-silyl)propyl Succinic Anhydride | 1.9 | 1.9 | 1.9 | 1.9 | 1.9 | 1.9 | 1.9 | 1.9 |
| Trimethoxy(octadecyl)silane | 1 | | | | | | | |
| Isobutyl Trimethoxysilane | | 1 | | | | | | |
| Hexyltrimethoxysilane | | | 1 | | | | | |
| Decyltrimethoxysilane | | | | 1 | | | | |
| Isooctyltrimethoxysilane | | | | | 1 | | | |
| Hexadecyltrimethoxysilane | | | | | | 1 | | |
| Propyltrimethoxysilane | | | | | | | 1 | |
| Octyltriethoxysilane | | | | | | | | 1 |
| Total | 100 | 100 | 100 | 100 | 100 | 100 | 100 | 100 |

| Ingredient | Examples | | | | | | | | |
|---|---|---|---|---|---|---|---|---|---|
| | 22 | 23 | 24 | 25 | 26 | 27 | 28 | 29 | 30 |
| ST-O25 | 70 | 80 | 75 | 72 | 76 | 76 | 76 | 76 | 76 |
| Deionized water | 14.1 | 19.1 | 11.1 | 13.1 | 11.1 | 11.1 | 11.1 | 11.1 | 11 |
| Propylene Glycol | 13 | 8 | 10 | 12 | 10 | 10 | 10 | 10 | 10 |
| 3-(Triethoxysilyl)propyl Succinic Anhydride | 2.9 | | | | | | | | |
| N-(Triethoxysilylpropyl)-O-Polyethyleneoxide Urethane | | 2.9 | | | 1.9 | 1.9 | 1.9 | 1.9 | 1.9 |

| Ingredient | 22 | 23 | 24 | 25 | 26 | 27 | 28 | 29 | 30 |
|---|---|---|---|---|---|---|---|---|---|
| Silane, trimethoxy[3-(oxiranyl methoxy)propyl] | | 3.9 | | | | | | | |
| 3-Ureidopropyl Triethoxysilane | | | 2.9 | | | | | | |
| 2-(3,4 epoxycyclohexyl)-ethyltrimethoxysilane | | | | 1 | | | | | |
| 3-(Trimethoxysilyl)propyl Methacrylate | | | | | 1 | | | | |
| Hexamethyl Disiloxane | | | | | | | 1 | | |
| Hexamethyl Disilazane | | | | | | | | 1 | |
| Trimethoxy Methyl Silane | | | | | | | | | 1 |
| Total | 100 | 100 | 100 | 100 | 100 | 100 | 100 | 100 | 100 |

| Ingredient | 31 | 32 | 33 | 34 | 35 | 36 | 37 |
|---|---|---|---|---|---|---|---|
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| N-(Triethoxysilylpropyl)-O-Polyethyleneoxide Urethane | 1.9 | 1.9 | 1.9 | 1.9 | 1.9 | 1.9 | 1.9 |
| Trimethoxy Phenyl Silane | 1 | | | | | | |
| Vinyl Trimethoxysilane | | 1 | | | | | |
| 3-(N,N-Dimethylaminopropyl)-Trimethoxysilane | | | 1 | | | | |
| 3-(Diethylamino)propyl trimethoxysilane | | | | 1 | | | |
| Trimethoxy-(octadecyl)silane | | | | | 1 | | |
| Isobutyl Trimethoxysilane | | | | | | 1 | |
| Hexyl-trimethoxysilane | | | | | | | 1 |
| Total | 100 | 100 | 100 | 100 | 100 | 100 | 100 |

| Ingredients | 38 | 39 | 40 | 41 | 42 |
|---|---|---|---|---|---|
| ST-O25 | 76 | 76 | 76 | 76 | 76 |
| Deionized water | 11.1 | 11.1 | 11.1 | 11.1 | 11.1 |
| Propylene Glycol | 10 | 10 | 10 | 10 | 10 |
| N-(Triethoxysilylpropyl)-O-Polyethyleneoxide Urethane | 1.9 | 1.9 | 1.9 | 1.9 | 1.9 |
| Decyl-trimethoxysilane | 1 | | | | |
| Isooctyl-trimethoxysilane | | 1 | | | |
| Hexadecyl-trimethoxysilane | | | 1 | | |
| Propyl-trimethoxysilane | | | | 1 | |
| Octyl-triethoxysilane | | | | | 1 |
| Total | 100.00 | 100.00 | 100.00 | 100.00 | 100.00 |

| Ingredient | 43 | 44 | 45 | 46 | 47 | 48 | 49 | 50 | 51 |
|---|---|---|---|---|---|---|---|---|---|
| ST-O25 | 76 | 76 | 70 | 80 | 76 | 76 | 76 | 76 | 76 |
| Deionized water | 10 | 9 | 16.1 | 11.1 | 11.1 | 11.1 | 11.1 | 11.1 | 11 |
| Propylene Glycol | 11.1 | 12.1 | 11 | 6 | 10 | 10 | 10 | 10 | 10 |
| 3-(Triethoxysilyl)propyl Succinic Anhydride | 2.9 | | | | | | | | |
| N-(Triethoxysilylpropyl)-O-Polyethyleneoxide Urethane | | 2.9 | | | | | | | |

| Ingredient | \multicolumn{9}{c}{Examples} |
| --- | --- | --- | --- | --- | --- | --- | --- | --- | --- |
|  | 43 | 44 | 45 | 46 | 47 | 48 | 49 | 50 | 51 |
| Silane, trimethoxy[3-(oxiranyl methoxy)propyl] |  |  | 2.9 |  | 1.9 | 1.9 | 1.9 | 1.9 | 1.9 |
| 3-Ureidopropyl Triethoxysilane |  |  |  | 2.9 |  |  |  |  |  |
| 2-(3,4 epoxycyclohexyl)-ethyltrimethoxysilane |  |  |  |  | 1 |  |  |  |  |
| 3-(Trimethoxysilyl)propyl Methacrylate |  |  |  |  |  | 1 |  |  |  |
| Hexamethyl Disiloxane |  |  |  |  |  |  | 1 |  |  |
| Hexamethyl Disilazane |  |  |  |  |  |  |  | 1 |  |
| Trimethoxy Methyl Silane |  |  |  |  |  |  |  |  | 1 |
| Total | 100 | 100 | 100 | 100 | 100 | 100 | 100 | 100 | 100 |

| Ingredients | Examples | | | | | | |
| --- | --- | --- | --- | --- | --- | --- | --- |
|  | 52 | 53 | 54 | 55 | 56 | 57 | 58 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Propylene Glycol | 10 | 10 | 10 | 10 | 10 | 10 | 10 |
| Silane, trimethoxy[3-(oxiranyl methoxy)propyl] | 1.9 | 1.9 | 1.9 | 1.9 | 1.9 | 1.9 | 1.9 |
| Trimethoxy Phenyl Silane | 1 |  |  |  |  |  |  |
| Vinyl Trimethoxysilane |  | 1 |  |  |  |  |  |
| 3-(N,N-Dimethylaminopropyl)-Trimethoxysilane |  |  | 1 |  |  |  |  |
| 3-(Diethylamino)propyl trimethoxysilane |  |  |  | 1 |  |  |  |
| Trimethoxy(octadecyl)silane |  |  |  |  | 1 |  |  |
| Isobutyl Trimethoxysilane |  |  |  |  |  | 1 |  |
| Hexyltrimethoxysilane |  |  |  |  |  |  | 1 |
| Total | 100.00 | 100.00 | 100.00 | 100.00 | 100.00 | 100.00 | 100.00 |

| Ingredients | Examples | | | | | | | | | |
| --- | --- | --- | --- | --- | --- | --- | --- | --- | --- | --- |
|  | 59 | 60 | 61 | 62 | 63 | | | | | |
| ST-O25 | 76 | 76 | 76 | 76 | 76 | | | | | |
| Deionized water | 11.1 | 11.1 | 11.1 | 11.1 | 11.1 | | | | | |
| Propylene Glycol | 10 | 10 | 10 | 10 | 10 | | | | | |
| Silane, trimethoxy[3-(oxiranyl methoxy)propyl] | 1.9 | 1.9 | 1.9 | 1.9 | 1.9 | | | | | |
| Decyltrimethoxysilane | 1 |  |  |  |  | | | | | |
| Isooctyltrimethoxysilane |  | 1 |  |  |  | | | | | |
| Hexadecyltrimethoxysilane |  |  | 1 |  |  | | | | | |
| Propyltrimethoxysilane |  |  |  | 1 |  | | | | | |
| Octyltriethoxysilane |  |  |  |  | 1 | | | | | |
| Total | 100.00 | 100.00 | 100.00 | 100.00 | 100.00 | | | | | |

| Ingredients | Examples | | | | | | | | | |
| --- | --- | --- | --- | --- | --- | --- | --- | --- | --- | --- |
|  | 64 | 65 | 66 | 67 | 68 | 69 | 70 | 71 | 72 | 73 |
| ST-O25 | 76 | 76 | 76 | 76 | 76 | 76 | 76 | 76 | 76 | 76 |
| Deionized water | 11.1 | 11.1 | 11.1 | 11.1 | 11.1 | 11.1 | 11.1 | 11.1 | 11 | 11.1 |
| Propylene Glycol | 10 | 10 | 10 | 10 | 10 | 10 | 10 | 10 | 10 | 10 |
| 3-(Triethoxysilyl)propyl Succinic Anhydride | 1.45 |  |  |  |  |  |  |  |  |  |
| N-(Triethoxysilylpropyl)-O-Polyethyleneoxide Urethane | 1.45 | 2.9 |  |  |  |  |  |  |  |  |
| Silane, trimethoxy[3-(oxiranyl methoxy)propyl] |  |  | 2.9 |  |  |  |  |  |  |  |
| 3-Ureidopropyl Triethoxysilane |  |  |  | 2.9 | 1.9 | 1.9 | 1.9 | 1.9 | 1.9 | 1.9 |
| 2-(3,4 epoxycyclohexyl)-ethyltrimethoxysilane |  |  |  |  | 1 |  |  |  |  |  |

-continued

| Ingredients | Examples | | | | | | | | | |
|---|---|---|---|---|---|---|---|---|---|---|
| | 64 | 65 | 66 | 67 | 68 | 69 | 70 | 71 | 72 | 73 |
| 3-(Trimethoxysilyl)propyl Methacrylate | | | | | | 1 | | | | |
| Hexamethyl Disiloxane | | | | | | | 1 | | | |
| Hexamethyl Disilazane | | | | | | | | 1 | | |
| Trimethoxy Methyl Silane | | | | | | | | | 1 | |
| Trimethoxy Phenyl Silane | | | | | | | | | | 1 |
| Total | 100 | 100 | 100 | 100 | 100 | 100 | 100 | 100 | 100 | 100 |

| Ingredients | Examples | | | | | | | |
|---|---|---|---|---|---|---|---|---|
| | 74 | 75 | 76 | 77 | 78 | 79 | 80 | 81 |
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Propylene Glycol | 10 | 10 | 10 | 10 | 10 | 10 | 10 | 10 |
| 3-Ureidopropyl Triethoxysilane | 1.9 | 1.9 | 1.9 | 1.9 | 1.9 | 1.9 | 1.9 | 1.9 |
| Vinyl Trimethoxysilane | 1 | | | | | | | |
| 3-(N,N-Dimethylaminopropyl)-Trimethoxysilane | | 1 | | | | | | |
| 3-(Diethylamino)propyl trimethoxysilane | | | 1 | | | | | |
| Trimethoxy(octadecyl)silane | | | | 1 | | | | |
| Isobutyl Trimethoxysilane | | | | | 1 | | | |
| Hexyltrimethoxysilane | | | | | | 1 | | |
| Decyltrimethoxysilane | | | | | | | 1 | |
| Isooctyltrimethoxysilane | | | | | | | | 1 |
| Hexadecyltrimethoxysilane | | | | | | | | |
| Propyltrimethoxysilane | | | | | | | | |
| Octyltriethoxysilane | | | | | | | | |
| Total | 100.00 | 100.00 | 100.00 | 100.00 | 100.00 | 100.00 | 100.00 | 100.00 |

| Ingredients | Examples | | |
|---|---|---|---|
| | 82 | 83 | 84 |
| ST-O25 | 76 | 76 | 76 |
| Deionized water | 11.1 | 11.1 | 11.1 |
| Propylene Glycol | 10 | 10 | 10 |
| 3-Ureidopropyl Triethoxysilane | 1.9 | 1.9 | 1.9 |
| Hexadecyltrimethoxysilane | 1 | | |
| Propyltrimethoxysilane | | 1 | |
| Octyltriethoxysilane | | | 1 |
| Total | 100.00 | 100.00 | 100.00 |

| Ingredients | Examples | | | | |
|---|---|---|---|---|---|
| | 85 | 86 | 87 | 88 | 89 |
| ST-O25 | 76 | 76 | 76 | 76 | 76 |
| Deionized water | 11.1 | 11.1 | 11.1 | 11.1 | 11.1 |
| Ethylene Glycol | 10 | 10 | 10 | 10 | 10 |
| 3-(Triethoxysilyl)propyl Succinic Anhydride | 2.9 | | | | 1.9 |
| N-(Triethoxysilylpropyl)-O-Polyethyleneoxide Urethane | | 2.9 | | | |
| Silane, trimethoxy[3-(oxiranyl methoxy)propyl] | | | 2.9 | | |
| 3-Ureidopropyl Triethoxysilane | | | | 2.9 | |
| 2-(3,4 epoxycyclohexyl)-ethyltrimethoxysilane | | | | | 1 |
| 3-(Trimethoxysilyl)propyl Methacrylate | | | | | |
| Hexamethyl Disiloxane | | | | | |
| Hexamethyl Disilazane | | | | | |
| Total | 100.00 | 100.00 | 100.00 | 100.00 | 100.00 |

| Ingredients | Examples | | |
|---|---|---|---|
| | 90 | 91 | 92 |
| ST-O25 | 76 | 76 | 76 |
| Deionized water | 11.1 | 11.1 | 11.1 |

-continued

| Ingredients | Examples | | |
|---|---|---|---|
| | 90 | 91 | 92 |
| Ethylene Glycol | 10 | 10 | 10 |
| 3-(Triethoxysilyl)propyl Succinic Anhydride | 1.9 | 1.9 | 1.9 |
| 3-(Trimethoxysilyl)propyl Methacrylate | 1 | | |
| Hexamethyl Disiloxane | | 1 | |
| Hexamethyl Disilazane | | | 1 |
| Total | 100.00 | 100.00 | 100.00 |

| Ingredients | Examples | | | | | | |
|---|---|---|---|---|---|---|---|
| | 93 | 94 | 95 | 96 | 97 | 98 | 99 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| 3-(Triethoxysilyl)propyl Succinic Anhydride | 1.9 | 1.9 | 1.9 | 1.9 | 1.9 | 1.9 | 1.9 |
| Trimethoxy Methyl Silane | 1 | | | | | | |
| Trimethoxy Phenyl Silane | | 1 | | | | | |
| Vinyl Trimethoxysilane | | | 1 | | | | |
| Total | 100.00 | 100.00 | 100.00 | 100.00 | 100.00 | 100.00 | 100.00 |

| Ingredients | Examples | | | | | |
|---|---|---|---|---|---|---|
| | 100 | 101 | 102 | 103 | 104 | 105 |
| ST-O25 | 76 | 76 | 76 | 76 | 76 | 76 |
| Deionized water | 11.1 | 11.1 | 11.1 | 11.1 | 11.1 | 11.1 |
| Ethylene Glycol | 10 | 10 | 10 | 10 | 10 | 10 |
| 3-(Triethoxysilyl)propyl Succinic Anhydride | 1.9 | 1.9 | 1.9 | 1.9 | 1.9 | 1.9 |
| Hexyltrimethoxysilane | 1 | | | | | |
| Decyltrimethoxysilane | | 1 | | | | |
| Isooctyltrimethoxysilane | | | 1 | | | |
| Hexadecyltrimethoxysilane | | | | 1 | | |
| Propyltrimethoxysilane | | | | | 1 | |
| Octyltriethoxysilane | | | | | | 1 |
| Total | 100.00 | 100.00 | 100.00 | 100.00 | 100.00 | 100.00 |

| Ingredients | Examples | | | | | | |
|---|---|---|---|---|---|---|---|
| | 106 | 107 | 108 | 109 | 110 | 111 | 112 |
| ST-O25 | 78 | 74 | 76 | 76 | 76 | 76 | 76 |
| Deionized water | 11.1 | 11.1 | 11.1 | 11.1 | 11.1 | 11.1 | 11.1 |
| Ethylene Glycol | 8 | 12 | 10 | 10 | 10 | 10 | 10 |
| 3-(Triethoxysilyl)propyl Succinic Anhydride | 1.45 | | | | | | |
| N-(Triethoxysilylpropyl)-O-Polyethyleneoxide Urethane | 1.45 | 1.45 | | | 1.9 | 1.9 | 1.9 |
| Silane, trimethoxy[3-(oxiranyl methoxy)propyl] | | 1.45 | 1.45 | | | | |
| 3-Ureidopropyl Triethoxysilane | | | 1.45 | 1.45 | | | |
| 2-(3,4 epoxycyclohexyl)-ethyltrimethoxysilane | | | | 1.45 | 1 | | |
| 3-(Trimethoxysilyl)propyl Methacrylate | | | | | | 1 | |
| Hexamethyl Disiloxane | | | | | | | 1 |
| Total | 100.00 | 100.00 | 100.00 | 100.00 | 100.00 | 100.00 | 100.00 |

|  | Examples | | | | | |
| --- | --- | --- | --- | --- | --- | --- |
| Ingredients | 113 | 114 | 115 | 116 | 117 | 118 |
| ST-O25 | 76 | 76 | 76 | 76 | 76 | 76 |
| Deionized water | 11.1 | 11.1 | 11.1 | 11.1 | 11.1 | 11.1 |
| Ethylene Glycol | 10 | 10 | 10 | 10 | 10 | 10 |
| N-(Triethoxysilylpropyl)-O-Polyethyleneoxide Urethane | 1.9 | 1.9 | 1.9 | 1.9 | 1.9 | 1.9 |
| Hexamethyl Disilazane | 1 | | | | | |
| Trimethoxy Methyl Silane | | 1 | | | | |
| Trimethoxy Phenyl Silane | | | 1 | | | |
| Vinyl Trimethoxysilane | | | | 1 | | |
| 3-(N,N-Dimethylaminopropyl)-Trimethoxysilane | | | | | 1 | |
| 3-(Diethylamino)propyl trimethoxysilane | | | | | | 1 |
| Total | 100.00 | 100.00 | 100.00 | 100.00 | 100.00 | 100.00 |

|  | Examples | | | | | | | |
| --- | --- | --- | --- | --- | --- | --- | --- | --- |
| Ingredients | 119 | 120 | 121 | 122 | 123 | 124 | 125 | 126 |
| ST-O25 | 76 | 76 | 76 | 76 | 76 | 76 | 76 | 76 |
| Deionized water | 11.1 | 11.1 | 11.1 | 11.1 | 11.1 | 11.1 | 11.1 | 11.1 |
| Ethylene Glycol | 10 | 10 | 10 | 10 | 10 | 10 | 10 | 10 |
| N-(Triethoxysilylpropyl)-O-Polyethyleneoxide Urethane | 1.9 | 1.9 | 1.9 | 1.9 | 1.9 | 1.9 | 1.9 | 1.9 |
| Trimethoxy(octadecyl)silane | 1 | | | | | | | |
| Isobutyl Trimethoxysilane | | 1 | | | | | | |
| Hexyltrimethoxysilane | | | 1 | | | | | |
| Decyltrimethoxysilane | | | | 1 | | | | |
| Isooctyltrimethoxysilane | | | | | 1 | | | |
| Hexadecyltrimethoxysilane | | | | | | 1 | | |
| Propyltrimethoxysilane | | | | | | | 1 | |
| Octyltriethoxysilane | | | | | | | | 1 |
| Total | 100.00 | 100.00 | 100.00 | 100.00 | 100.00 | 100.00 | 100.00 | 100.00 |

|  | Examples | | | | | | | |
| --- | --- | --- | --- | --- | --- | --- | --- | --- |
| Ingredients | 127 | 128 | 129 | 130 | 131 | 132 | 133 | 134 |
| ST-O25 | 76 | 76 | 78 | 74 | 76 | 76 | 76 | 76 |
| Deionized water | 11.1 | 9.1 | 9.1 | 12.1 | 11.1 | 11.1 | 11.1 | 11.1 |
| Ethylene Glycol | 10 | 12 | 10 | 10 | 10 | 10 | 10 | 10 |
| 3-(Triethoxysilyl)propyl Succinic Anhydride | 1.45 | | | | | | | |
| N-(Triethoxysilylpropyl)-O-Polyethyleneoxide Urethane | | 1.45 | | | | | | |
| Silane, trimethoxy[3-(oxiranyl methoxy)propyl] | 1.45 | | 1.45 | | 1.9 | 1.9 | 1.9 | 1.9 |
| 3-Ureidopropyl Triethoxysilane | | 1.45 | | 1.45 | | | | |
| 2-(3,4 Epoxycyclohexyl)-ethyltrimethoxysilane | | | 1.45 | | 1 | | | |
| 3-(Trimethoxysilyl)propyl Methacrylate | | | | 1.45 | | | | |
| | | | | | | 1 | | |

-continued

|  | Examples | | | | | | | |
|---|---|---|---|---|---|---|---|---|
| Ingredients | 127 | 128 | 129 | 130 | 131 | 132 | 133 | 134 |
| Hexamethyl Disiloxane |  |  |  |  |  |  | 1 |  |
| Hexamethyl Disilazane |  |  |  |  |  |  |  | 1 |
| Total | 100.00 | 100.00 | 100.00 | 100.00 | 100.00 | 100.00 | 100.00 | 100.00 |

|  | Examples | | | | | | |
|---|---|---|---|---|---|---|---|
| Ingredients | 135 | 136 | 137 | 138 | 139 | 140 | 141 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| Silane, trimethoxy[3-(oxiranyl methoxy)propyl] | 1.9 | 1.9 | 1.9 | 1.9 | 1.9 | 1.9 | 1.9 |
| Trimethoxy Methyl Silane | 1 |  |  |  |  |  |  |
| Trimethoxy Phenyl Silane |  | 1 |  |  |  |  |  |
| Vinyl Trimethoxysilane |  |  | 1 |  |  |  |  |
| 3-(N,N-Dimethylaminopropyl)-Trimethoxysilane |  |  |  | 1 |  |  |  |
| 3-(Diethylamino)propyl trimethoxysilane |  |  |  |  | 1 |  |  |
| Trimethoxy(octadecyl)silane |  |  |  |  |  | 1 |  |
| Isobutyl Trimethoxysilane |  |  |  |  |  |  | 1 |
| Total | 100.00 | 100.00 | 100.00 | 100.00 | 100.00 | 100.00 | 100.00 |

|  | Examples | | | | | |
|---|---|---|---|---|---|---|
| Ingredients | 142 | 143 | 144 | 145 | 146 | 147 |
| ST-O25 | 76 | 76 | 76 | 76 | 76 | 76 |
| Deionized water | 11.1 | 11.1 | 11.1 | 11.1 | 11.1 | 11.1 |
| Ethylene Glycol | 10 | 10 | 10 | 10 | 10 | 10 |
| Silane, trimethoxy[3-(oxiranyl methoxy)propyl] | 1.9 | 1.9 | 1.9 | 1.9 | 1.9 | 1.9 |
| Hexyltrimethoxysilane | 1 |  |  |  |  |  |
| Decyltrimethoxysilane |  | 1 |  |  |  |  |
| Isooctyltrimethoxysilane |  |  | 1 |  |  |  |
| Hexadecyltrimethoxysilane |  |  |  | 1 |  |  |
| Propyltrimethoxysilane |  |  |  |  | 1 |  |
| Octyltriethoxysilane |  |  |  |  |  | 1 |
| Total | 100.00 | 100.00 | 100.00 | 100.00 | 100.00 | 100.00 |

|  | Examples | | | | | | |
|---|---|---|---|---|---|---|---|
| Ingredients | 148 | 149 | 150 | 151 | 152 | 153 | 154 |
| ST-O25 | 76 | 76 | 76 | 76 | 76 | 76 | 76 |
| Deionized water | 6.1 | 7.1 | 8.1 | 9.1 | 11.1 | 11.1 | 11.1 |
| Ethylene Glycol | 15 | 14 | 13 | 12 | 10 | 10 | 10 |
| 3-(Triethoxysilyl)propyl Succinic Anhydride | 2.9 |  |  |  |  |  |  |
| N-(Triethoxysilylpropyl)-O-Polyethyleneoxide Urethane |  | 2.9 |  |  |  |  |  |

-continued

| Ingredients | Examples | | | | | | |
|---|---|---|---|---|---|---|---|
| | 148 | 149 | 150 | 151 | 152 | 153 | 154 |
| Silane, trimethoxy[3-(oxiranyl methoxy)propyl] | | | 2.9 | | | | |
| 3-Ureidopropyl Triethoxysilane | | | | 2.9 | 1.9 | 1.9 | 1.9 |
| 2-(3,4 epoxycyclohexyl)-ethyltrimethoxysilane | | | | | 1 | | |
| 3-(Trimethoxysilyl)propyl Methacrylate | | | | | | 1 | |
| Hexamethyl Disiloxane | | | | | | | 1 |
| Total | 100.00 | 100.00 | 100.00 | 100.00 | 100.00 | 100.00 | 100.00 |

| Ingredients | Examples | | | | | | |
|---|---|---|---|---|---|---|---|
| | 155 | 156 | 157 | 158 | 159 | 160 | 161 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| 3-Ureidopropyl Triethoxysilane | 1.9 | 1.9 | 1.9 | 1.9 | 1.9 | 1.9 | 1.9 |
| Hexamethyl Disilazane | 1 | | | | | | |
| Trimethoxy Methyl Silane | | 1 | | | | | |
| Trimethoxy Phenyl Silane | | | 1 | | | | |
| Vinyl Trimethoxysilane | | | | 1 | | | |
| 3-(N,N-Dimethylaminopropyl)-Trimethoxysilane | | | | | 1 | | |
| 3-(Diethylamino)propyl trimethoxysilane | | | | | | 1 | |
| Trimethoxy(octadecyl)silane | | | | | | | 1 |
| Total | 100.00 | 100.00 | 100.00 | 100.00 | 100.00 | 100.00 | 100.00 |

| Ingredients | Examples | | | | | | |
|---|---|---|---|---|---|---|---|
| | 162 | 163 | 164 | 165 | 166 | 167 | 168 |
| ST-O25 | 76 | 76 | 76 | 76 | 76 | 76 | 76 |
| Deionized water | 11.1 | 11.1 | 11.1 | 11.1 | 11.1 | 11.1 | 11.1 |
| Ethylene Glycol | 10 | 10 | 10 | 10 | 10 | 10 | 10 |
| 3-Ureidopropyl Triethoxysilane | 1.9 | 1.9 | 1.9 | 1.9 | 1.9 | 1.9 | 1.9 |
| Isobutyl Trimethoxysilane | 1 | | | | | | |
| Hexyltrimethoxysilane | | 1 | | | | | |
| Decyltrimethoxysilane | | | 1 | | | | |
| Isooctyltrimethoxysilane | | | | 1 | | | |
| Hexadecyltrimethoxysilane | | | | | 1 | | |
| Propyltrimethoxysilane | | | | | | 1 | |
| Octyltriethoxysilane | | | | | | | 1 |
| Total | 100.00 | 100.00 | 100.00 | 100.00 | 100.00 | 100.00 | 100.00 |

|  |  | Examples | | | | | | |
| --- | --- | --- | --- | --- | --- | --- | --- | --- |
| Description | Ingredients | 169 | 170 | 171 | 172 | 173 | 174 | 175 |
| Colloidal silica 25 wt % silica solids available from Nissan Chemical America | ST-O-25 | 52.68 |  | 50 |  | 51 |  | 25 |
| Alkaline Colloidal Silica from Nissan Chemical Company, Japan | ST-32C |  | 59.28 |  | 48 |  | 45 | 25 |
|  | Deionized water | 36.05 | 27.97 | 40 | 41.5 | 38.5 | 43 | 35 |
|  | Propylene Glycol |  |  |  | 8 | 7.5 | 8.5 |  |
|  | Ethylene Glycol | 8.06 | 9.85 | 7.5 |  |  |  | 10 |
|  | Silane, trimethoxy[3-(oxiranyl methoxy)propyl] | 3.21 | 2.9 | 2.5 | 2.5 | 3 | 3.5 | 5 |
|  | Total (g) | 100 | 100 | 100 | 100 | 100 | 100 | 100 |

Brine resistant silica sols and hydrocarbon recovery fluids comprising surface functionalized nanoparticles, where the surface functionalized nanoparticles are brine resistant silica sols, can be found in U.S. patent application Ser. No. 15/946,252; filed Apr. 5, 2018, entitled "Brine Resistant Silica Sols"; U.S. patent application Ser. No. 15/946,338, filed Apr. 5, 2018, entitled "Hydrocarbon Formation Treatment Micellar Solutions"; U.S. patent application Ser. No. 16/129,688; filed: Sep. 12, 2018, entitled "Crude Oil Recovery Chemical Fluids", which application claims priority to Japanese Patent Application No. JP 2017-175511; and U.S. patent application Ser. No. 16/129,705; filed: Sep. 12, 2018, entitled "Crude Oil Recovery Chemical Fluid", which application claims priority to Japanese Patent Application No. JP 2017-175511; wherein all US patents and patent Applications disclosed anywhere in this disclosure are herein incorporated by reference, in their entirety.

Comparative (Failed) Examples of Non-Brine Resistant Colloidal Silica Sols

Comparative (Failed) Example 1

Applicant performed a series of experiments to reproduce the product referred to by BARAN in U.S. Pat. No. 7,033,975, Column 9, lines 32-48. Applicant reproduced the surface-modified nanoparticles using the procedure as outlined in BARAN The silica sols obtained were all visibly quite gelatinous, indicating a lack of stability, which renders them unusable for use in treatment of underperforming oil and gas wells. Due to their lack of stability, no brine resistant testing was done.

The repeated example from the 3M/Baran patent (Particles A) made in our laboratories using the described surface treatment material and method was not stable in water due to excessive Hydrophobic character. In the Baran patent continued colloidal stability was not a desired property. The silicasol in the described 3M example was dried after synthesis and the resulting powder was used as an additive to make a foam. Brine stability was not a targeted property of this colloidal silica. The colloidal silica was not even stable in water after surface treatment due to excessive Hydrophobic character of the surface treatment & would be even less stable in brine than pure water. Our invention requires both stability after synthesis and also stability in contact with brine.

Comparative (Failed) Example 2

From Japanese Unexamined Patent Application Publication H3-31380,

"Coating Composition" assigned to

Daihachi Chem. Inc. Co., Ltd. {Japanese Patent Application No. H1-164505.}

Date of Application is 27 Jun. 1989.

Inventors are Noriaki Tokuyasu and Hiroshi Yamanaka.

Embodiments 1, 2, 3, 4 and 5 as well as Ref. Examples 1 and 2 are duplicated.

All examples gelled immediately upon mixing with brine, therefore, no 24-hour test data is recorded.

| Embodiment | Turbidity Initial (NTU) | Turbidity 10 min (NTU) |
| --- | --- | --- |
| 1 | 998 | 1011 |
| 2 | 270 | 231 |
| 3 | 1463 | 1284 |
| 4 | 825 | 567 |
| 5 | 4666 | 4225 |
| Ref Ex 1 | 1539 | 1051 |
| Ref Ex 2 | 3078 | 2800 |

The disclosure in this patent application and all the examples within are meant for Sol-Gel coatings and are therefore substantially non-aqueous. As is to be expected, upon exposure to 10% API brine all these examples gelled/polymerized the silica immediately. Low turbidity numbers are from examples where the silica agglomerated and sedimented out of solution before the Turbidimeter was able to read a high NTU number.

It is believed, without intending to be bound thereby, that the Daihichi patent application examples all failed because they were too hydrophobic and essentially meant to be used in non-aqueous environments such as sol-gel coatings. In practice, there is no mixing of hydrophilic and hydrophobic silanes. The examples from this published Japanese Patent Application are designed to be good silica sols for Sol-Gel coatings only.

The following Table, Table 2 summarizes an Example of BRINE RESISTANT SDND Treatment Sequence Using One of the Brine Resistant Colloidal Silica Sols previously described.

| Description | Conc. (ppg) | Clean Vol. (Mgal) | Stage Prop. (Mlbs) | Fluid | Proppant |
|---|---|---|---|---|---|
| Acid | 0 | 3 | | | |
| BRINE RESISTANT SDND Spacer | 0 | 2 | | | |
| BRINE RESISTANT SDND | 0 | 1.2 | | | |
| BRINE RESISTANT SDND Spacer | 0 | 1 | | | |
| Pad | 0 | 20 | | | |
| Slurry | 0.25 | 12 | 3 | Slickwater | 100 Mesh |
| Slurry | 0.5 | 12 | 6 | Slickwater | 100 Mesh |
| Slurry | 0.75 | 16 | 12 | Slickwater | 100 Mesh |
| Slurry | 1 | 16 | 16 | Slickwater | 100 Mesh |
| Slurry | 0.75 | 8 | 6 | Slickwater | 40/70 NW |
| Slurry | 1 | 8 | 8 | Slickwater | 40/70 NW |
| Slurry | 1.25 | 8 | 10 | Slickwater | 40/70 NW |
| Slurry | 1.5 | 8 | 12 | Slickwater | 40/70 NW |
| Slurry | 1.75 | 10 | 17.5 | Linear Gel | 40/70 NW |
| Slurry | 2 | 10 | 20 | Linear Gel | 40/70 NW |
| Slurry | 2.25 | 12 | 27 | Linear Gel | 40/70 NW |
| Slurry | 2.5 | 12 | 30 | Linear Gel | 40/70 NW |
| Slurry | 3 | 16 | 48 | Linear Gel | 40/70 NW |
| Slurry | 3 | 12 | 36 | Linear Gel | 40/70 RCP |
| Flush | 0 | 14.6 | 0 | Slickwater | |
| Total (Pad & Prop. Laden) | | 180 | 251.5 | | |

The following Case Studies have been performed on 5 wells located in Eddy and Lea Counties, N. Mex. All 5 wells were treated with the BRINE RESISTANT SDND on each stage of the fracture stimulation. Each well's completion summary and production analysis will be discussed in further detail in the following paragraphs of this paper.

It is well documented in the Petroleum Literature (Lee, Holditch, and others) that decline curve analysis associated with low permeability formations in both vertical and horizontal wells, can be very erroneous with limited production data. These erroneous predictions are mainly due to constant changes in the effective decline rates and slightly varying hyperbolic exponents (b-factor) during the wells early production life. The effective declines and hyperbolic exponents are varying over time, up to several years in some cases, due to the combination of zones with varying permeabilities, degrees of stimulation, and production rates, prior to the well achieving boundary dominated, pseudo-radial flow conditions. For this reason, the authors have chosen to analyze production enhancements using production rates and cumulative production plots compared to formulated type curves for the wells treated with the BRINE RESISTANT SDND.

For each well included in the Case Study, a type curve for each formation was plotted against the actual daily production recorded from the well. The type curves were constructed by the operator of the subject wells from actual production curves from previously drilled wells which directly offset the subject wells. In each case, the wells used to construct the type curves were treated with a nano-emulsion surfactant during the fracture stimulations. The type curves were verified using results obtained from reservoir simulation models.

Apart from Well A-1, which was pumped at an average rate of 38.5 BPM and completed with 43 stages, the stimulation designs for each study area were similar with respect to average proppant volumes, stages completed, and injection rates to help ensure an accurate comparison. Tables depicting the average stage stimulation results are discussed for each well included in the Case Study.

For purposes of the analyses in this patent application, the monthly type curve and actual daily and monthly production volumes were converted to Barrels of Oil Equivalent (BOE) volumes. The operator used a simple conversion equal to 6.0 Mscf/day per BOE, which was then added to the daily oil volumes. The cumulative BOE type curve estimates for each well and its associated productive formation are summarized in Table 3. The actual production volumes and comparisons are discussed in detail

TABLE 2

10-Year Predicted Type Curve Summaries, BOE

| | Well Name | | | | |
|---|---|---|---|---|---|
| Time | Well A-1 (Cum. BOE) | Well A-2 (Cum. BOE) | Well A-3 (Cum. BOE) | Well B-1 (Cum. BOE) | Well B-2 (Cum. BOE) |
| 30 Days | 20,834 | 24,632 | 24,632 | 17,405 | 17,456 |
| 60 Days | 38,685 | 46,047 | 46,047 | 31,794 | 32,535 |
| 90 Days | 54,432 | 65,205 | 65,205 | 44,210 | 45,928 |
| 6 Months | 93,441 | 113,341 | 113,341 | 74,248 | 79,471 |
| 12 Months | 151,047 | 186,099 | 186,099 | 117,691 | 129,957 |
| 2 Years | 230,000 | 289,010 | 289,010 | 177,101 | 201,197 |
| 3 Years | 286,665 | 365,397 | 365,397 | 220,400 | 254,026 |
| 4 Years | 331,634 | 427,696 | 427,696 | 255,422 | 297,100 |
| 5 Years | 369,249 | 481,024 | 481,024 | 285,260 | 333,966 |
| 10 Years | 503,142 | 677,727 | 677,727 | 395,331 | 474,847 |

It is well documented in the petroleum literature that unconventional reservoirs are sensitive to the Extended Stimulated Reservoir Volume (ESRV). By extending the ESRV it is possible to alter and improve initial production rate and the initial effective decline, resulting in increased recovery. Conventional proppants, even 100 Mesh or smaller, are too large to penetrate micro-darcy fractures necessary to extend the drainage area.

One interesting observation on all five subject wells, was that in each case the percent oil-cut was notably higher and the monthly water production figures were lower than expected.

Case Study Area "A"—Eddy County, N. Mex.

There are three wells selected for study in the Eddy County, N. Mex. area. Details for each of the treatments and the corresponding production increases associated with the BRINE RESISTANT SDND are discussed in the following paragraphs associated with Case Study Area "A". (The actual well names have been changed.) All three wells, county location, and associated producing formations are shown in Table 4.

Case Study Wells and Formations, Eddy County, N. Mex.

| Well Name | County | Formation |
|---|---|---|
| Well A-1 | Eddy County | Wolfcamp B |
| Well A-2 | Eddy County | Wolfcamp X-Y |
| Well A-3 | Eddy County | Wolfcamp X-Y |

Well A-1: Wolfcamp B

Well A-1 was spud in March and was drilled to a total depth (TD) of 14,640 ft (9,887 ft TVD) with an 8½" borehole. Upon reaching measured TD, 5½", 20.0 lb/ft, P-110 casing was run to 14,639 ft and cemented with 1,420 sacks of cement. The well was fracture stimulated with 43 stages along the horizontal lateral using an average of 268,880 lbs of 30/50 Northern White (NW) proppant per stage. A summary of the average stimulation treatment values over all 43 stages is shown in Table 5.

TABLE 3

Well A-1: Average Per Stage Stimulation Data (43 Stages)

| Description | Value |
|---|---|
| Number of Stages | 43 |
| Average Injection Rate, BPM | 38.5 |
| Maximum Injection Rate, BPM | 39.9 |
| Final Fracture Gradient, psi/ft | 0.89 |
| Proppant Type | 30/50 NW |
| Total Avg. Proppant per Stage, lbs | 269,000 |
| 15% HCl per Stage, gal | 700 |
| Slickwater per Stage, gal | 76,500 |
| Linear Gel per Stage, gal | 136,500 |
| XL Gel per Stage, gal | 24,500 |
| BRINE RESISTANT SDND per Stage, gal | 500 |

Figure 9:
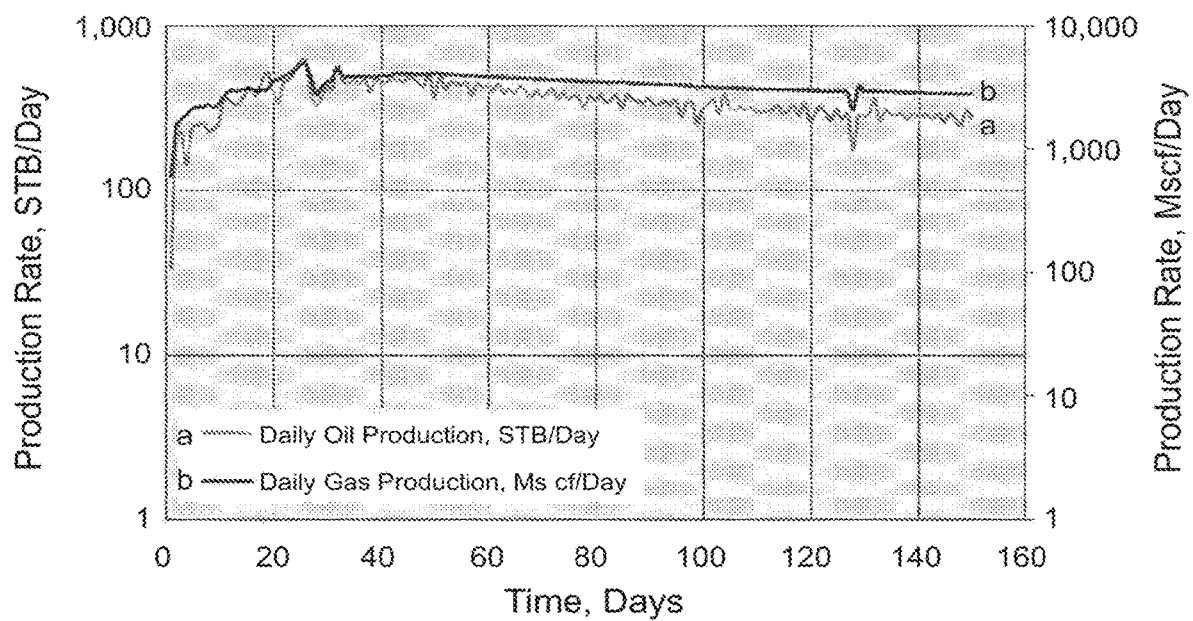
FIG. 9 shows Well A-1: Actual Daily Oil and Gas Production
Figure 10:
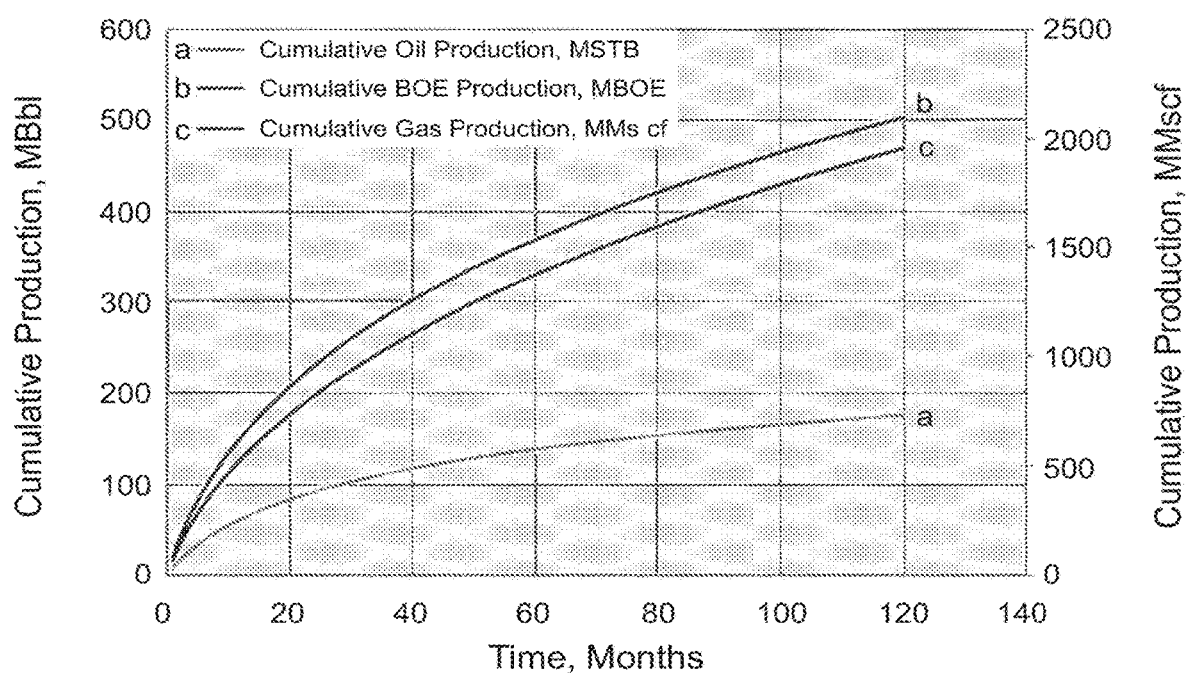
FIG. 10 Well A-1: Wolfcamp B Type Curve Production (120 Months)
Figure 11:
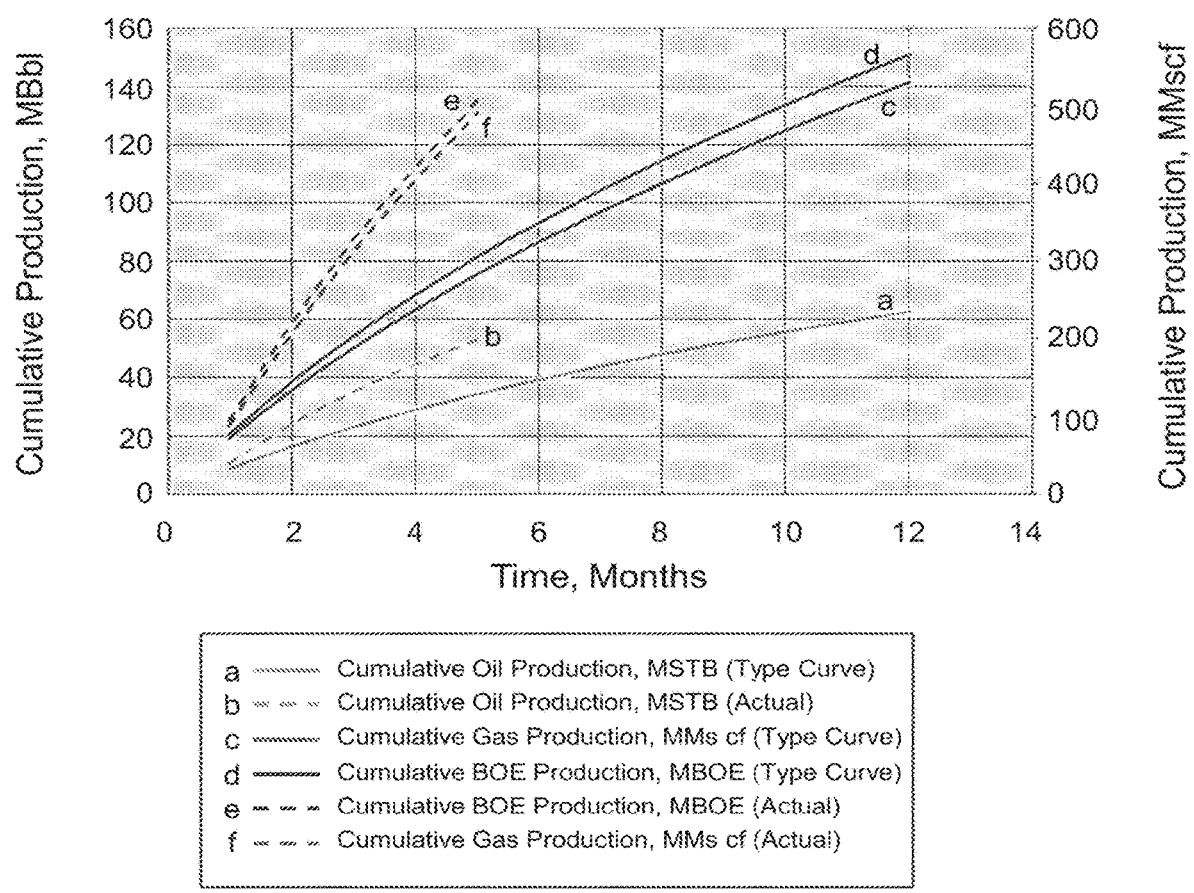
FIG. 11 Well A-1: Actual Production Versus Type Curve

The actual daily production for the first 150 days and the type curve (TC) anticipated production (120-month forecast) for the Wolfcamp B formation is plotted in FIGS. 9 and 10, respectively. The production response attributed to the BRINE RESISTANT SDND is forecast in FIG. 11. As shown in FIG. 11 and tabulated in Table 6, the actual production in BOE for the first 150 days (5 months) of production for Well A-1 exceeded the type curve prediction by 53,864 BOE, which equates to a 66.1% increase over predicted production.

Due to the possible errors in forecasted volumes using decline curve forecasts, both positive and negative, the cumulative production plots normalize the actual data making the predicted decline curves irrelevant. While the base economics for each case are not presented as part of this analysis, it is evident that the significant increase in production will present tremendous improvement in the NPV and IRR associated with the project.

The disjoining pressure and fragmentation of the hydrocarbons in the Wolfcamp B reservoir, associated with the BRINE RESISTANT SDND, are repeatedly resulting in significant increases in initial production rates and early cumulative production volumes not only in the Delaware Basin, but have been noted in the DJ Basin, the Bakken, the Wolfcamp in the Midland Basin, and the Austin Chalk, Buda and Frio formations in central Texas). The BRINE RESISTANT SDND has not yet been used in the Eagle Ford Shale formation.

TABLE 6

Well A-1: Actual Versus Type Curve Production @ 5 Months

| Month | Cum. Actual Prod. (MBOE) | Cum. TC Prod. (MBOE) | Percent Increase |
|---|---|---|---|
| 1 | 25.2 | 20.6 | 24.2 |
| 2 | 58.4 | 38.7 | 50.9 |
| 3 | 87.5 | 54.4 | 50.8 |
| 4 | 112.6 | 68.6 | 64.1 |
| 5 | 135.4 | 81.5 | 66.1 |

Well A-2: Wolfcamp X-Y Sand

Well A-2 was spud in February and was drilled to a TD of 14,032 ft (9,222 ft TVD) with an 8¾" borehole. Upon reaching measured TD, 5½", 20.0 lb/ft, P-110 casing was run to 14,032 ft and cemented with 2,100 sacks of cement. The well was fracture stimulated with 32 stages along the horizontal lateral using an average of 293,500 lbs of NW and Resin Coated Proppant (RCP) per stage. A summary of the average stimulation treatment values over all 32 stages is shown in Table 7.

TABLE 4

Well A-2: Average Per Stage Stimulation Data (32 Stages)

| Description | Value |
|---|---|
| Number of Stages | 32 |
| Average Injection Rate, BPM | 75.1 |
| Maximum Injection Rate, BPM | 77.2 |
| Final Fracture Gradient, psi/ft | 0.79 |
| Avg. 40/70 NW per Stage, lbs | 34,000 |
| Avg. 20/40 NW per Stage, lbs | 222,500 |
| Avg. 20/40 RCP per Stage, lbs | 34,000 |
| Total Avg. Proppant per Stage, lbs | 284,500 |
| 15% HCl per Stage, gal | 750 |
| Slickwater per Stage, gal | 21,000 |
| Linear Gel per Stage, gal | 55,000 |
| XL Gel per Stage, gal | 140,000 |
| BRINE RESISTANT SDND per Stage, gal | 750 |

Figure 12:
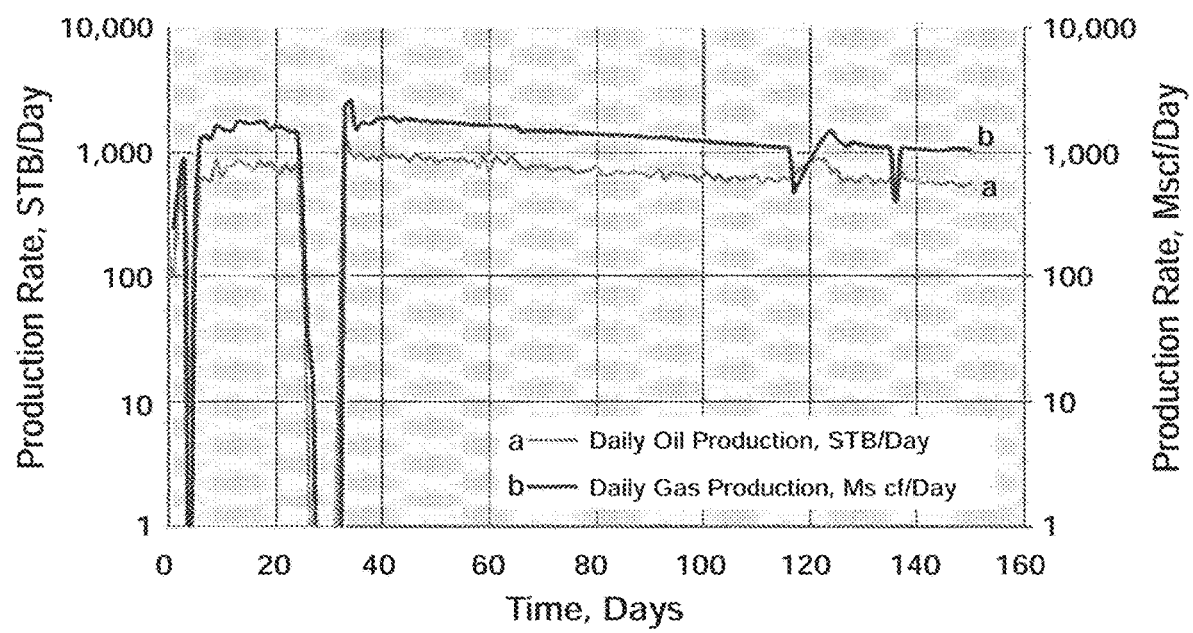
FIG. 12 Well A-2: Actual Daily Oil and Gas Production
Figure 13:
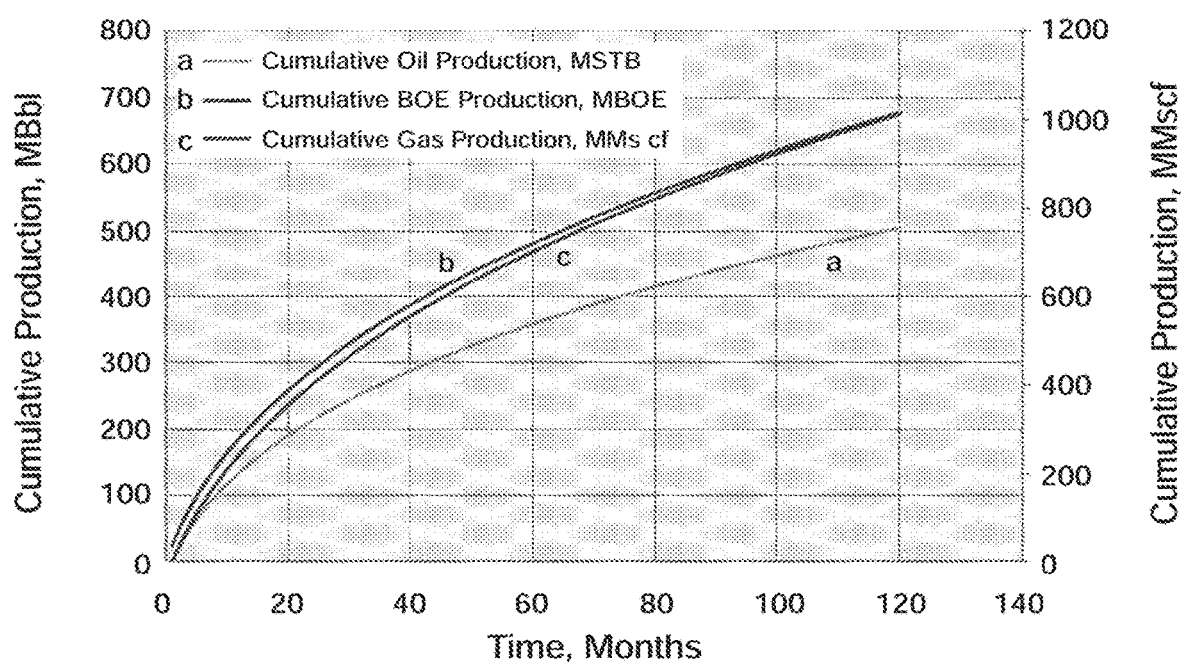
FIG. 13 Well A-2 & Well A-3: Wolfcamp X-Y Type Curve Production (120 Months)
FIG. 14 Well A-2: Actual Production Versus Type Curve
FIG. 15 Well A-3: Actual Daily Oil and Gas Production
FIG. 16 Well A-2: Actual Production Versus Type Curve
FIG. 17 Well B-1: Actual Daily Oil and Gas Production
FIG. 18 Well B-1: $3^{rd}$ Bone Spring Type Curve Production (120 months)
FIG. 19 Well B-1: Actual Production Versus Type Curve
FIG. 20 Well B-2: Actual Daily Oil and Gas Production
FIG. 21 Well B-2: $2^{nd}$ Bone Spring Type Curve Production (120 months)
FIG. 22 Well B-2: Actual Production Versus Type Curve
Figure 14:
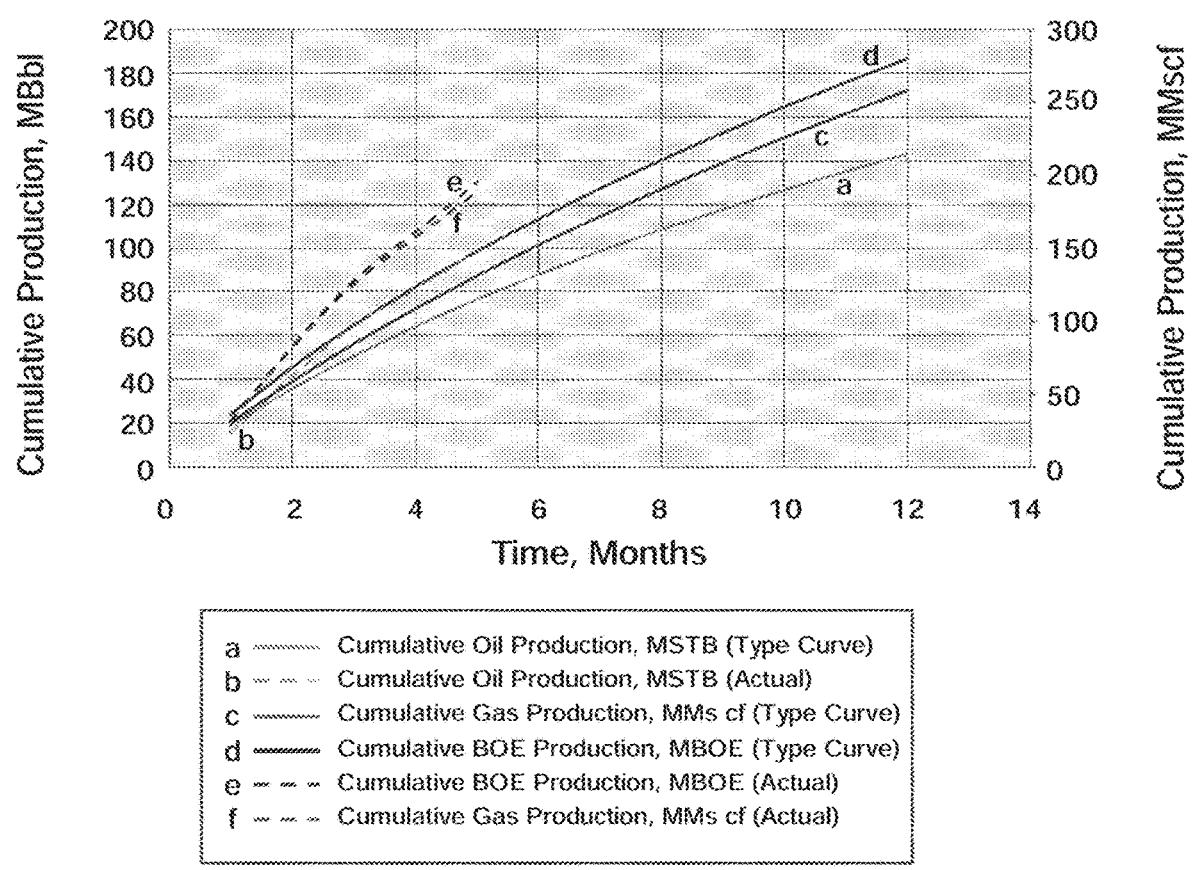

The actual daily production for the first 150 days and the TC anticipated production (120-month forecast) for the Wolfcamp X-Y Sand is plotted in FIGS. 12 and 13, respectively. The production response attributed to the BRINE RESISTANT SDND is forecast in FIG. 14. As shown in FIG. 14 and tabulated in Table 8, the actual production in BOE for the first 150 days (5 months) of production for Well A-2 exceeded the type curve prediction by 31,776 BOE, which equates to a 32.3% increase over predicted production.

TABLE 5

Well A-2: Actual Versus Type Curve Production @ 5 Months

| Month | Cum. Actual Prod. (MBOE) | Cum. TC Prod. (MBOE) | Percent Incr./Decr. |
|---|---|---|---|
| 1 | 21.3 | 24.6 | −13.4 |
| 2 | 55.5 | 46.1 | 20.6 |
| 3 | 85.4 | 65.2 | 31.0 |
| 4 | 107.7 | 82.6 | 30.4 |
| 5 | 130.3 | 98.5 | 32.3 |

The decreased actual amount of production compared to the predicted TC volume of 24.6 MBOE, was due to a partial month production. In month two (2), the cumulative production not only caught up to the predicted volume, but surpassed the predicted type curve volumes by amount by 20.6%. As time has increased, the actual cumulative production has continued to increase over that predicted by the Wolfcamp X-Y Sand TC.

Well A-3: Wolfcamp X-Y Sand

Well A-3 was spud in November and was drilled to a TD of 13,882 ft (9,314 ft TVD) with an 8¾" borehole. Upon reaching measured TD, 5½", 20.0 lb/ft, P-110 casing was run to 13,882 ft and cemented with 2,545 sacks of cement. The well was fracture stimulated with 32 stages along the horizontal lateral using an average of 283,000 lbs of NW and Resin Coated Proppant (RCP) per stage. A summary of the average stimulation treatment values over all 32 stages is shown in Table 9.

TABLE 6

Well A-3: Average Per Stage Stimulation Data (32 Stages)

| Description | Value |
|---|---|
| Number of Stages | 32 |
| Average Injection Rate, BPM | 72.7 |
| Maximum Injection Rate, BPM | 77.0 |
| Final Fracture Gradient, psi/ft | 0.81 |
| Avg. 40/70 NW per Stage, lbs | 30,000 |
| Avg. 20/40 NW per Stage, lbs | 222,500 |
| Avg. 20/40 RCP per Stage, lbs | 30,500 |
| Total Avg. Proppant per Stage, lbs | 283,000 |
| 15% HCl per Stage, gal | 1,750 |
| Slickwater per Stage, gal | 23,000 |
| Linear Gel per Stage, gal | 50,000 |
| XL Gel per Stage, gal | 140,500 |
| BRINE RESISTANT SDND per Stage, gal | 500 |

Figure 15:
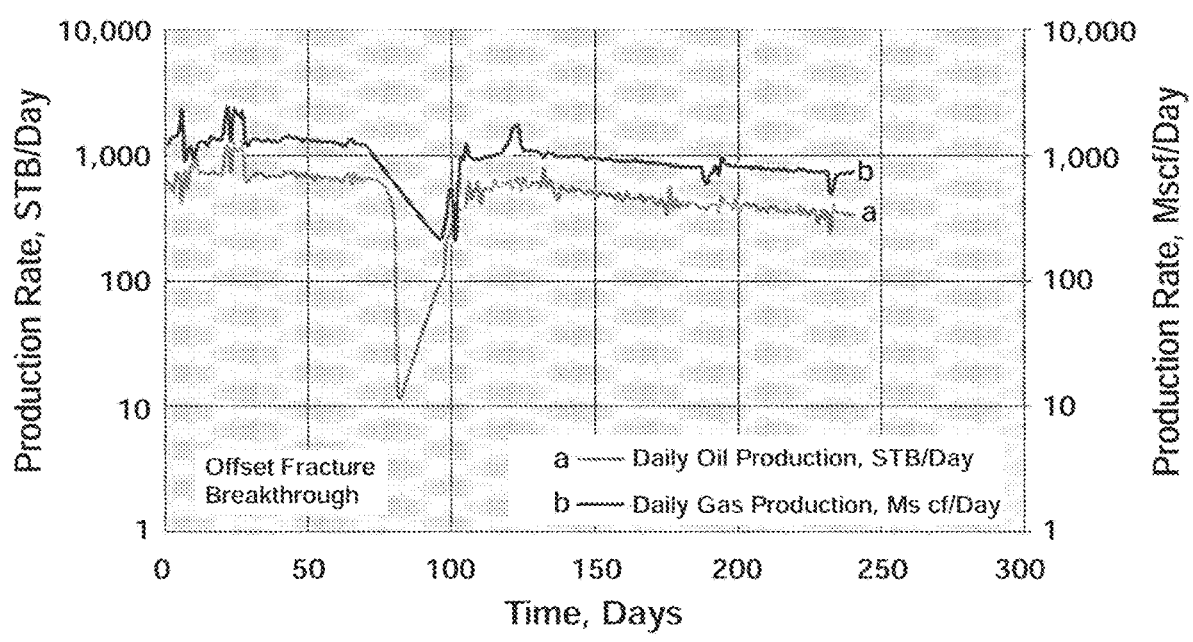
Figure 16:
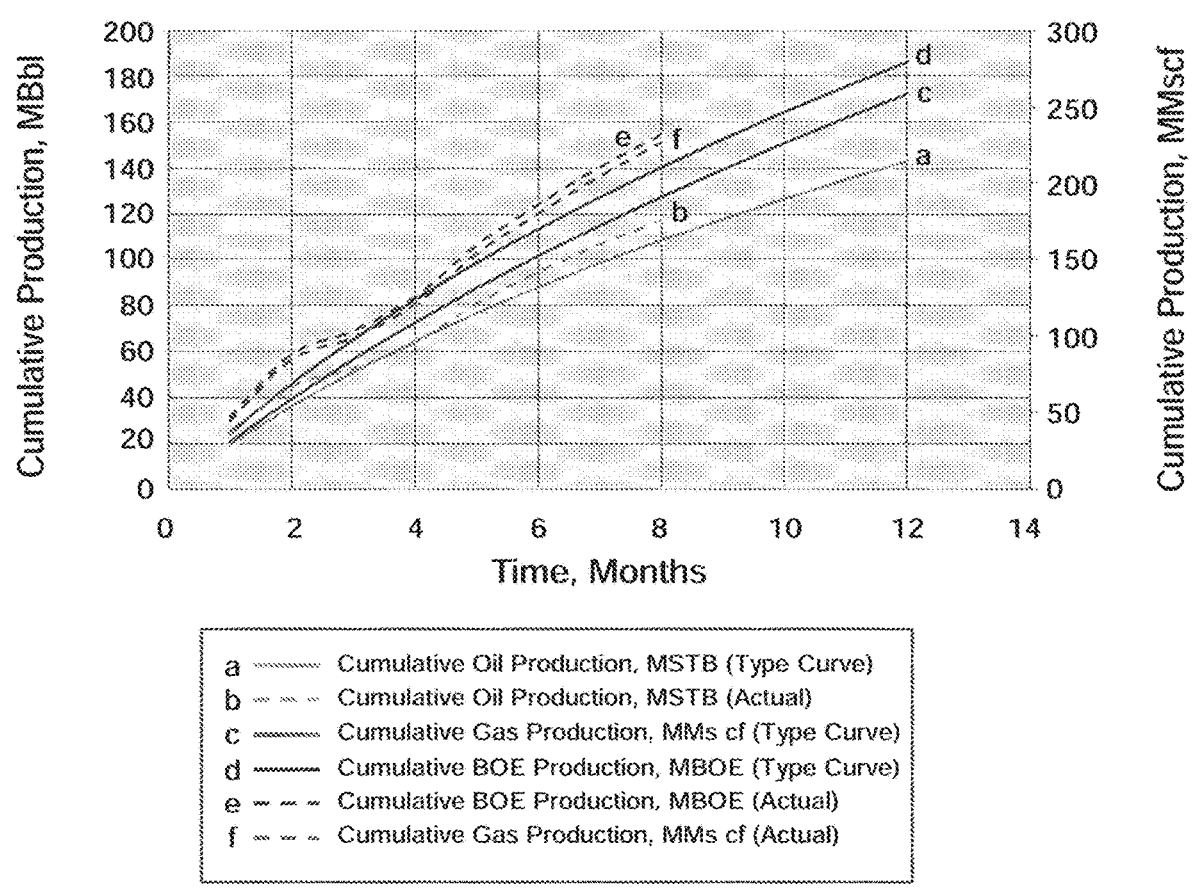

The actual daily production for the first 240 days is plotted in FIG. 15. The TC for Well A-3 is identical to Well A-2 since they are producing in the same reservoir and is previously shown in FIG. 13. The production response attributed to the BRINE RESISTANT SDND is forecast in FIG. 16. As shown in FIG. 16 and tabulated in Table 10, the actual production in BOE for the first 240 days (8 months) of production for Well A-3 exceeded the type curve prediction by 14,651 BOE, which equates to a 10.5% increase over predicted production.

Starting 68 days into the well's early production an offset well to Well A-3 fraced into the A-3 lateral, and dramatically reduced the daily oil and gas volumes for a period of a few weeks. It is noteworthy here that in addition to the BRINE RESISTANT SDND's chemistry to be independent of formation lithology, it also appears to remain at residual levels within the rock matrix and fracture networks to continue to improve flow mechanics over time. The residual presence within the fracture network was observed in core studies performed by an operator in the DJ Basin using Niobrara core. As shown in Table 10, the production figures after the offset well fracture breakthrough continued to improve compared to the predicted type curve values.

TABLE 7

Well A-2: Actual Versus Type Curve Production @ 8 Months

| Month | Cum. Actual Prod. (MBOE) | Cum. TC Prod. (MBOE) | Percent Incr./Decr. |
|---|---|---|---|
| 1 | 31.3 | 24.6 | 25.7 |
| 2 | 58.8 | 46.1 | 27.5 |
| 3 | 69.0 | 65.2 | 5.8 |
| 4 | 83.8 | 82.6 | 1.5 |
| 5 | 106.2 | 98.5 | 7.8 |
| 6 | 124.5 | 113.3 | 9.9 |
| 7 | 140.5 | 127.2 | 10.5 |
| 8 | 154.9 | 140.2 | 10.5 |

Case Study Area "B"—Lea County, N. Mex.

There are two (2) wells selected for study in the Lea County, N. Mex. area. Details for each of the treatments and the corresponding production increases associated with the BRINE RESISTANT SDND are discussed in the following paragraphs associated with Case Study Area "B". The actual well names have been changed. All both wells, county location, and associated producing formations are shown in Table 11.

TABLE 8

Case Study Wells and Formations, Lea County, NM

| Well Name | County | Formation |
|---|---|---|
| Well B-1 | Lea County | $3^{rd}$ Bone Spring |
| Well B-2 | Lea County | $2^{nd}$ Bone Spring |

Well B-1: $3^{rd}$ Bone Spring

Well B-1 was spud in August and was drilled to a TD of 16,082 ft (11,620 ft TVD) with an 8¾" borehole. Upon reaching measured TD, 5½", 20.0 lb/ft, P-110 casing was run to 16,082 ft and cemented with 1,655 sacks of cement. The well was fracture stimulated with 28 stages along the horizontal lateral using an average of 284,500 lbs of 40/70 NW, 40/70 Light-Weight Ceramic (LWC) Proppant and 20/40 LWC Proppant per stage. A summary of the average stimulation treatment values over all 28 stages is shown in Table 12.

TABLE 9

Well B-1: Average Per Stage Stimulation Data (28 Stages)

| Description | Value |
|---|---|
| Number of Stages | 28 |
| Average Injection Rate, BPM | 69.9 |
| Maximum Injection Rate, BPM | 75.0 |
| Final Fracture Gradient, psi/ft | 0.83 |
| Avg. 40/70 NW per Stage, lbs | 12,500 |
| Avg. 40/70 LW Ceramic per Stage, lbs | 139,500 |
| Avg. 20/40 LW Ceramic per Stage, lbs | 96,000 |
| Total Avg. Proppant per Stage, lbs | 248,000 |
| 15% HCl per Stage, gal | 3,000 |
| Slickwater per Stage, gal | 48,000 |
| XL Gel per Stage, gal | 121,500 |
| BRINE RESISTANT SDND per Stage, gal | 1,500 |

Figure 17:
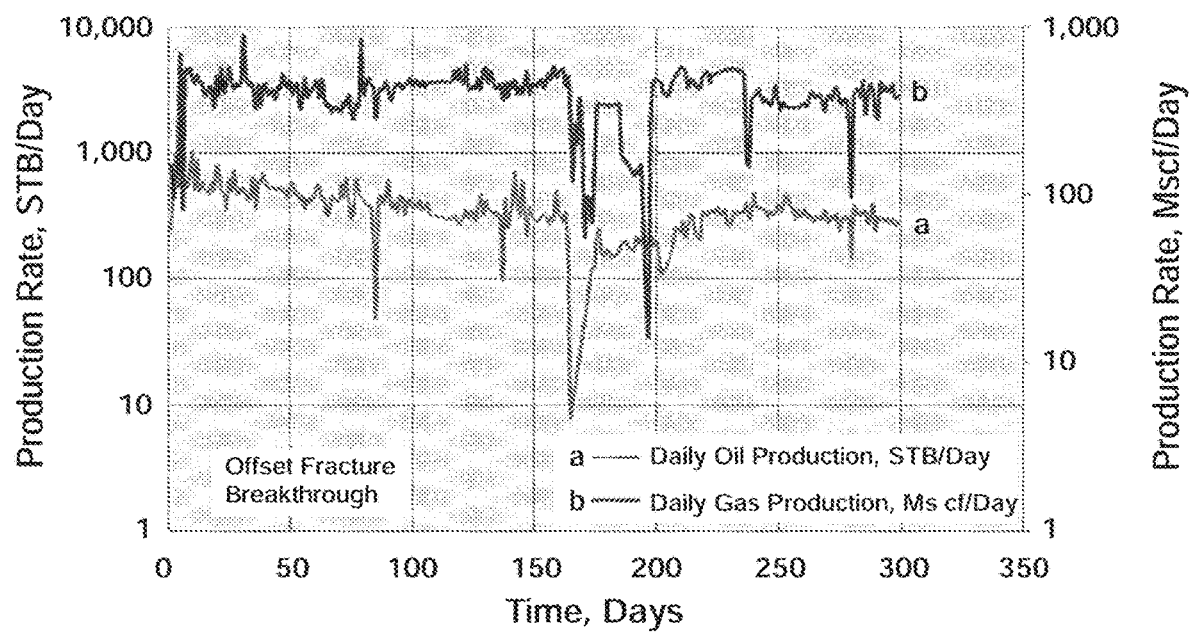
Figure 18:
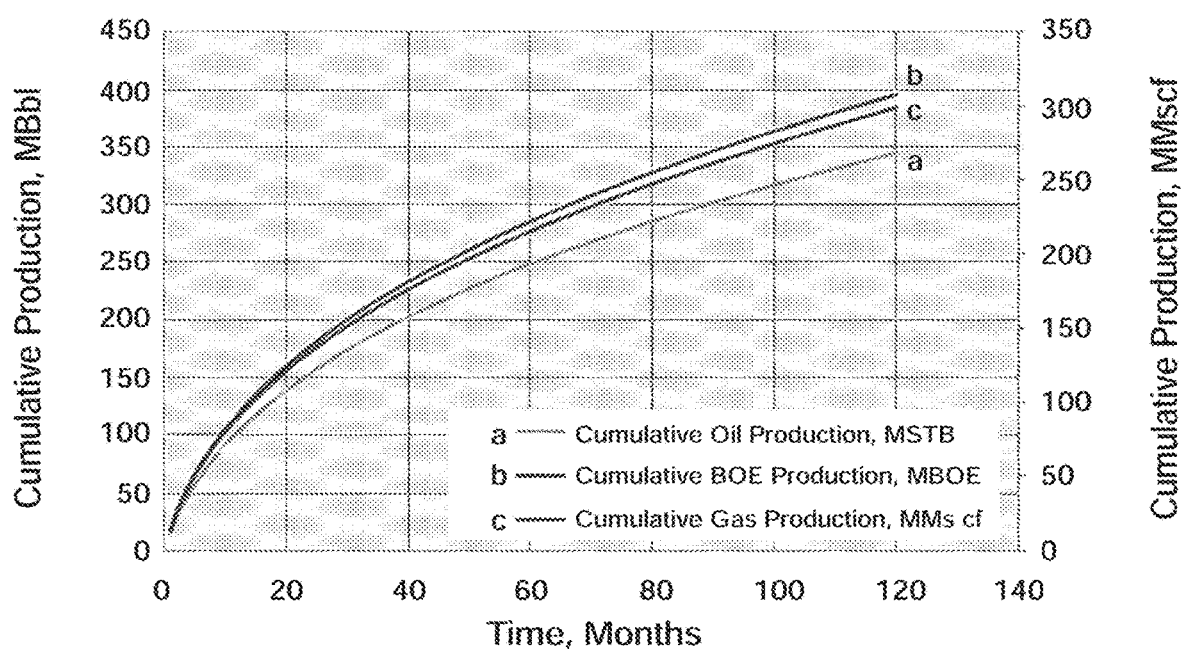
Figure 19:
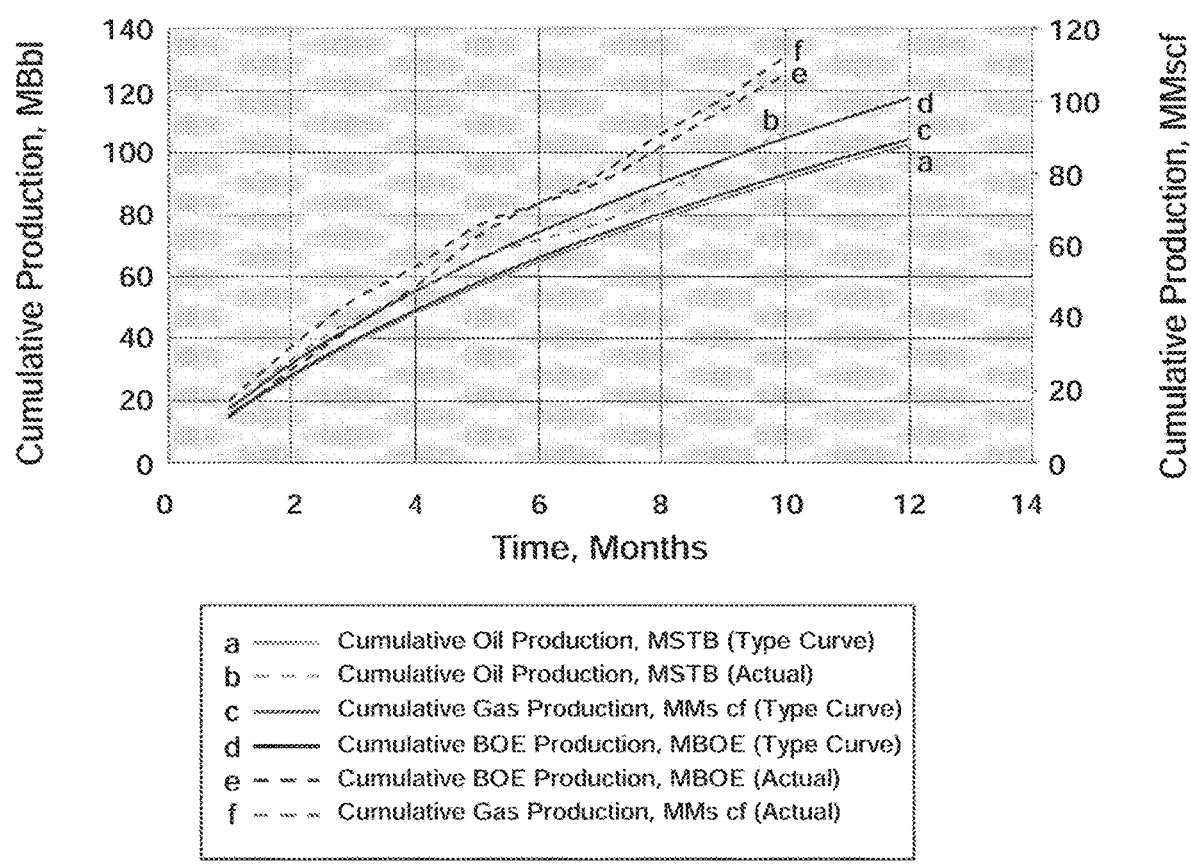

The actual daily oil and gas production for the first 300 days and the $3^{rd}$ Bone Spring TC is plotted in FIGS. 17 and 18, respectively. The production response attributed to the BRINE RESISTANT SDND is forecast in FIG. 19. As shown in FIG. 19 and tabulated in Table 13, the actual oil and gas production in BOE for the first 300 days (10 months) of production for Well B-1 exceeded the type curve prediction by 20,215 BOE, which equates to a 19.8% increase over predicted production.

After 159 days into the well's early production an offset well to the B-1 fraced into the B-1 lateral, and dramatically reduced the daily oil and gas volumes for a period of about 8 days. Similar to the response seen in the A-3 in Eddy County, the production from the B-1 recovered over several weeks' time and continued to increase compared to the $3^{rd}$ Bone Spring type curves.

TABLE 10

Well B-1: Actual Versus Type Curve Production @ 10 Months

| Month | Cum. Actual Prod. (MBOE) | Cum. TC Prod. (MBOE) | Percent Incr./Decr. |
|---|---|---|---|
| 1 | 20.0 | 17.4 | 14.9 |
| 2 | 37.4 | 31.8 | 17.6 |
| 3 | 52.3 | 44.2 | 18.3 |
| 4 | 63.1 | 55.2 | 14.3 |
| 5 | 76.1 | 65.2 | 16.7 |
| 6 | 83.6 | 74.2 | 12.7 |

TABLE 10-continued

Well B-1: Actual Versus Type Curve Production @ 10 Months

| Month | Cum. Actual Prod. (MBOE) | Cum. TC Prod. (MBOE) | Percent Incr./Decr. |
|---|---|---|---|
| 7 | 90.5 | 82.7 | 9.4 |
| 8 | 102.0 | 90.5 | 12.7 |
| 9 | 114.0 | 97.4 | 17.0 |
| 10 | 125.0 | 104.3 | 19.8 |

Well B-2: $2^{nd}$ Bone Spring

Well B-2 was spud in September and was drilled to a TD of 15,441 ft (10,808 ft TVD) with an 8¾" borehole. Upon reaching measured TD, 5½", 20.0 lb/ft, P-110 casing was run to 15,441 ft and cemented with 1,585 sacks of cement. The well was fracture stimulated with 29 stages along the horizontal lateral using an average of 218,500 lbs of 40/70 NW, 40/70 Light-Weight Ceramic (LWC) Proppant and 20/40 LWC Proppant per stage. A summary of the average stimulation treatment values over all 29 stages is shown in Table 14.

Figure 20:
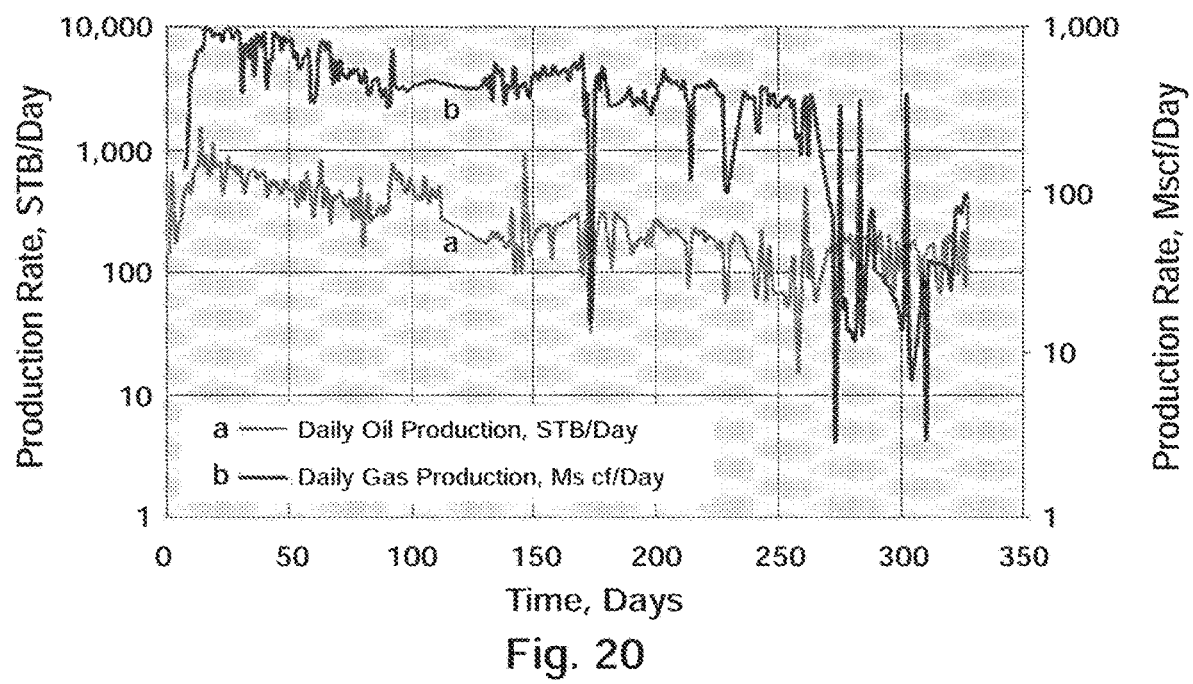
Figure 21:
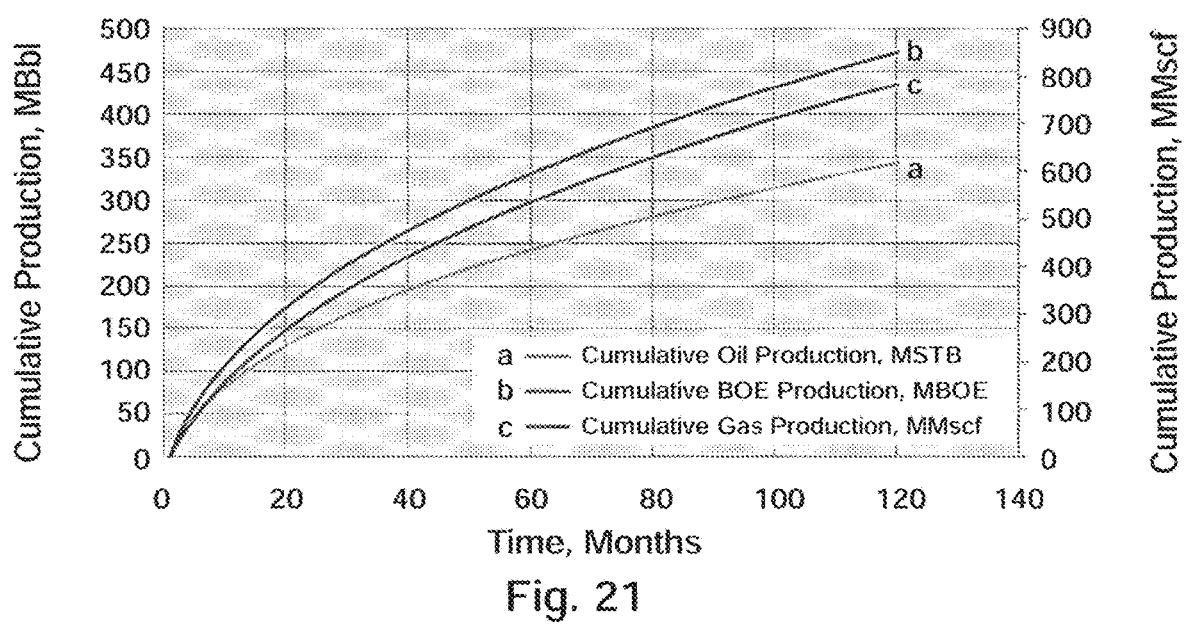
Figure 22:
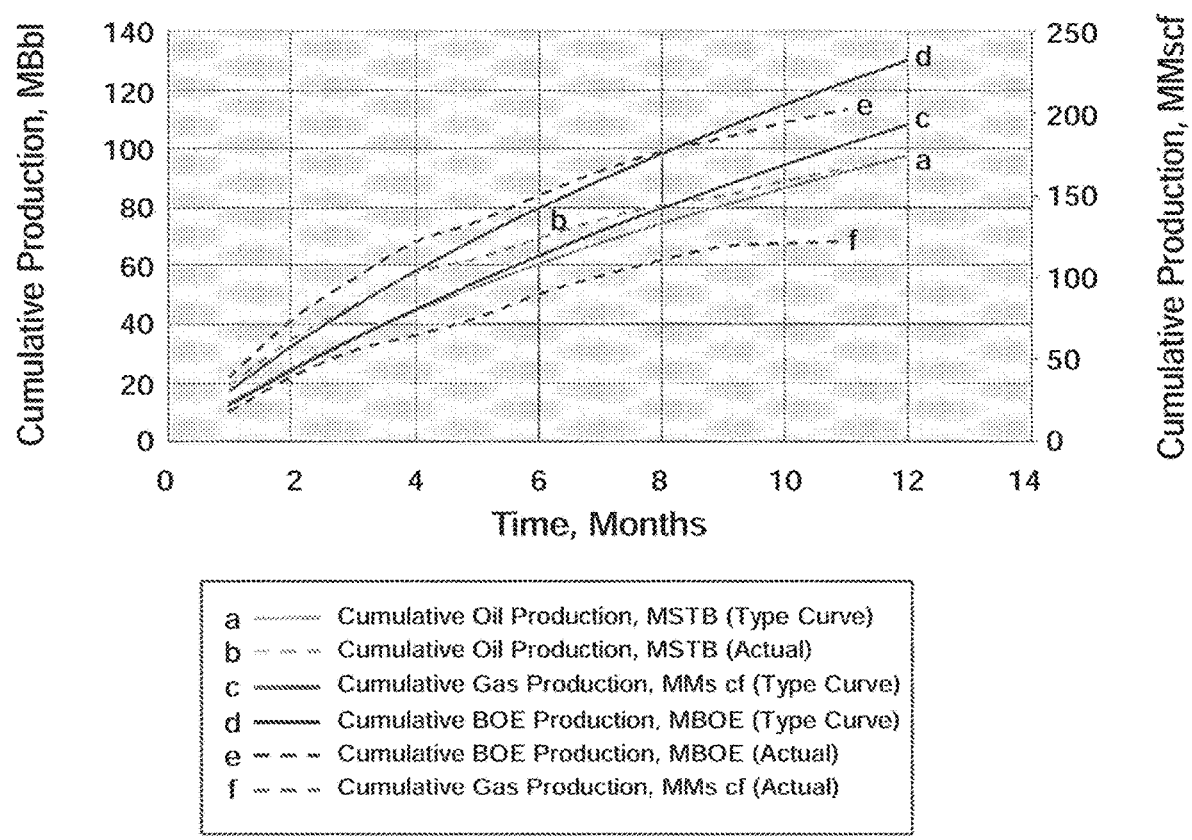

The actual daily oil and gas production for the first 300 days and the $3^{rd}$ Bone Spring TC is plotted in FIGS. 20 and 21, respectively. The production response attributed to the BRINE RESISTANT SDND is forecast in FIG. 22. As shown in FIG. 22 and tabulated in Table 15, the actual oil and gas production in BOE for the first two (2) months of production for Well B-2 exceeded the type curve prediction by 8,843 BOE, which equates to a 27.4% increase over predicted production. There are two significant production anomalies which need to be further explained, which become evident in FIG. 22 and drastically affect the cumulative production which was recorded for 327 days at the time of filing of this patent application.

After 113 days into the well's early production, the operator shut-in the B-2 was to avoid possible completion damage during fracture stimulation operations on another well directly offsetting the horizontal lateral. The well remained SI until the decision was made to continue, at which time it was returned to production by gas lift. Shortly thereafter, the well began experiencing severe gas supply problems which again affected the production over an extended period. The gas supply problems continued to plague the well's production which is seen in FIG. 20 at approximately 260 days of cumulative time. At that point, the well was worked over and artificial lift using a rod pump was installed on the well. The final several days of production in FIG. 20 shows a definitive slope change with respect to production rates. Information received from the operator has verified that the production has increased to the point that if present slopes continue, will again surpass the predicted TC volumes within the next 1-2 months.

TABLE 11

Well B-2: Average Per Stage Stimulation Data (29 Stages)

| Description | Value |
|---|---|
| Number of Stages | 29 |
| Average Injection Rate, BPM | 63.7 |
| Maximum Injection Rate, BPM | 72.0 |
| Final Fracture Gradient, psi/ft | 0.75 |
| Avg. 40/70 NW per Stage, lbs ($1^{st}$ Stg.) | 80,000 |
| Avg. 40/70 LW Ceramic per Stage, lbs | 31,000 |
| Avg. 20/40 LW Ceramic per Stage, lbs | 187,500 |
| Total Avg. Proppant per Stage, lbs | 218,500 |
| 15% HCl per Stage, gal | 3,000 |

TABLE 11-continued

Well B-2: Average Per Stage Stimulation Data (29 Stages)

| Description | Value |
|---|---|
| Slickwater per Stage, gal | 15,000 |
| Linear Gel per Stage, gal (where run) | 10,000 |
| XL Gel per Stage, gal | 98,000 |
| BRINE RESISTANT SDND per Stage, gal | 1,000 |

It is recommended that the application of pre-pad BRINE RESISTANT SDND pills be implemented in all types of reservoir flow systems to achieve enhanced project economics. In certain cases, the cost of the BRINE RESISTANT SDND may increase the overall completion cost, but early indications are that the incremental economics resulting from the increased revenues render the chemical cost increase negligible when compared to project NPV.

TABLE 12

Well B-2: Actual Versus Type Curve Production @ 10 Months

| Month | Cum. Actual Prod. (MBOE) | Cum. TC Prod. (MBOE) | Percent Incr./Decr. |
|---|---|---|---|
| 1 | 22.2 | 17.5 | 26.9 |
| 2 | 41.4 | 32.5 | 27.4 |
| 3 | 56.5 | 45.9 | 23.1 |
| 4 | 68.1 | 58.1 | 17.2 |
| 5 | 74.9 | 69.2 | 8.2 |
| 6 | 84.0 | 79.5 | 5.7 |
| 7 | 92.3 | 89.1 | 3.6 |
| 8 | 99.0 | 98.1 | 0.9 |
| 9 | 103.7 | 106.7 | -2.8 |
| 10 | 108.9 | 114.8 | -5.1 |
| 10.9 | 113.4 | 121.8 | -6.9 |

In summary, the stimulation of several Wolfcamp and Bone Springs targeted wells in the northern Delaware Basin using fracturing treatments and a new method employing relatively small pre-pad pill volumes of nanoparticle dispersions ahead of each stage of treatment have been successfully performed. The liquid nanoparticle dispersion pre-pad pills used in each stage consist of highly surface modified, neutral wet nanoparticles dispersed in small water volumes which penetrate the reservoir's natural fracture and secondary induced fracture network via accelerated diffusion into the reservoir beyond the primary induced fracture network, producing a Brownian motion activated, mechanical advantage process known as disjoining pressure. These neutral wet, solid nanoparticles aid in delivering improved efficacy in the recovery of hydrocarbons via counter-current imbibition by fragmenting the disjoined oil into smaller oil droplets, enabling a more efficient backflow to the propped fracture network and back to the wellbore. The nanoparticle dispersion pre-pad pills are used to introduce the nanoparticle dispersion farther into the reservoirs naturally fractured/permeable matrix network and employ the mechanisms described above to enhance and sustain the mobility of hydrocarbons (overcome confining capillary pressures) back to the propped facture network and subsequently to the wellbore.

Advantages of this method and mechanical process are the ability to access the reservoir beyond where proppants can be placed thereby improving the effective stimulated reservoir volume. The evaluation of results in these zones has shown that utilizing the nanoparticle pre-pad pills has resulted in significantly improved performance (20-30 percent higher than the best available technology) compared to over 15 offset wells when normalized with respect to stimulation and production techniques and procedures. The results include significantly higher oil cuts for a longer sustained time periods as well as providing earlier oil to surface after treatment flowback and continued flowing production before requiring artificial lift implementation. While the number of offset wells is greater than nanoparticle dispersion treated wells, the results clearly demonstrate that there is a positive impact as well as persistent improvement factor (EUR) from using the pre-pad nanoparticle dispersion pills ahead of each stage. The liquid nanoparticle dispersion pre-pad pills used in each stage consist of highly surface modified, neutral wet nanoparticles dispersed in small water volumes which penetrates via accelerated.

The BRINE RESISTANT SDND composition may eliminate the necessity of pumping other state-of-the-art surfactant additives.

Pre-pad pills are effective methods to place materials deeper into the reservoir system allowing recovery of incremental oil (counter-current imbibition).

Conventional Darcy's Law reservoir flow mechanics are enhanced due to the Brownian Motion diffusion driven effects from BRINE RESISTANT SDND treatments by overcoming Fick's Law of Diffusion.

BRINE RESISTANT SDND treatments can increase initial production rates exceeding 20.0% compared to wells either not treated with the BRINE RESISTANT SDND technology or treated by conventional nano-emulsion surfactants.

Increased incremental recovery and initial rate, by definition, will increase the projected NPV and Rate of Return.

In the claims, as well as in the specification above, all transitional phrases such as "comprising," "including," "carrying," "having," "containing," "involving," "holding," and the like are to be understood to be open-ended, i.e. to mean including but not limited to. Only the transitional phrases "consisting of" and "consisting essentially of" shall be closed or semi-closed transitional phrases, respectively.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

What is claimed is:

1. A method of treatment of an oil and gas system, the method comprising adding an aqueous brine resistant silicon dioxide nanoparticle dispersion into the oil and gas system as a pre-pad pill,
wherein the aqueous brine resistant silicon dioxide nanoparticle dispersion comprises silica nanoparticles surface modified with trimethoxy[3-(oxiranylmethoxy)propyl] silane in combination with an organosilane selected from 3-(triethoxysilyl)propyl succinic anhydride, 3-(trimethoxysilyl)propyl methacrylate, hexamethyl disiloxane, hexamethyl disilazane, trimethoxy methyl silane, trimethoxy phenyl silane, vinyl trimethoxysilane, 3-(N,N-dimethylaminopropyl)-trimethoxysilane, 3-(diethylamino)propyl trimethoxysilane, trimethoxy(octadecyl)silane, isobutyl trimethoxysilane, hexyltrimethoxysilane, decyltrimethoxysilane, isooctyltrimethoxysilane, hexadecyltrimethoxysilane, propyltrimethoxysilane, and octyltriethoxysilane, and
wherein the aqueous brine resistant silicon dioxide nanoparticle dispersion is characterized by having a change in turbidity of less than about 100 NTU after API brine exposure according to an API brine resistance test by use of a turbidimeter.

2. The method of claim 1, further comprising adding a frac stage fluid into the oil and gas system after the pre-pad pill, wherein the volume of the aqueous brine resistant silicon dioxide nanoparticle dispersion pre-pad pill is from about 500 to about 1,000 U.S. gallons per about 3,000 to about 6,000 U.S. barrels of the frac stage fluid.

3. The method of claim 2, wherein the silica nanoparticles have an average diameter of between about 12 nm and about 20 nm.

4. The method of claim 1, wherein the silica nanoparticles have an average diameter of between about 1 nm and about 100 nm.

5. The method of claim 1, wherein the silica nanoparticles have an average diameter of between about 12 nm and about 20 nm.

6. The method of claim 1, comprising the following steps of adding oil well treatment fluids to a well of the oil and gas system in the order given to the well:
a) adding an acid;
b) adding a fresh water spacer;
c) adding the aqueous brine resistant silicon dioxide nanoparticle dispersion pre-pad pill;
d) adding a fresh water spacer; and
e) inserting a pad of a frac treatment.

7. The method of claim 6, wherein the volume of the aqueous brine resistant silicon dioxide nanoparticle dispersion pre-pad pill is from about 500 to about 1,000 U.S. gallons per about 3,000 to about 6,000 U.S. barrels of the pad of the frac treatment.

8. The method of claim 7, wherein the silica nanoparticles have an average diameter of between about 12 nm and about 20 nm.

9. The method of claim 6, wherein the silica nanoparticles have an average diameter of between about 1 nm and about 100 nm.

10. The method of claim 6, wherein the silica nanoparticles have an average diameter of between about 12 nm and about 20 nm.

11. A method of increasing initial production rates of an oil well, the method comprising adding an aqueous brine resistant silicon dioxide nanoparticle dispersion into the oil well as a pre-pad pill,
wherein the aqueous brine resistant silicon dioxide nanoparticle dispersion comprises silica nanoparticles surface modified with trimethoxy[3-(oxiranylmethoxy)propyl] silane in combination with an organosilane selected from 3-(triethoxysilyl)propyl succinic anhydride, 3-(trimethoxysilyl)propyl methacrylate, hexamethyl disiloxane, hexamethyl disilazane, trimethoxy methyl silane, trimethoxy phenyl silane, vinyl trimethoxysilane, 3-(N,N-dimethylaminopropyl)-trimethoxysilane, 3-(diethylamino)propyl trimethoxysilane, trimethoxy(octadecyl)silane, isobutyl trimethoxysilane, hexyltrimethoxysilane, decyltrimethoxysilane, isooctyltrimethoxysilane, hexadecyltrimethoxysilane, propyltrimethoxysilane, and octyltriethoxysilane, and wherein the aqueous brine resistant silicon dioxide nanoparticle dispersion is characterized by having a change in turbidity of less than about 100 NTU after API brine exposure according to an API brine resistance test by use of a turbidimeter.

12. The method of claim 11, further comprising adding a frac stage fluid into the oil well after the pre-pad pill, wherein the volume of the aqueous brine resistant silicon dioxide nanoparticle dispersion pre-pad pill is from about 500 to about 1,000 U.S. gallons per about 3,000 to about 6,000 U.S. barrels of the frac stage fluid.

13. The method of claim 12, wherein the silica nanoparticles have an average diameter of between about 12 nm and about 20 nm.

14. The method of claim 11, wherein the silica nanoparticles have an average diameter of between about 1 nm and about 100 nm.

15. The method of claim 11, wherein the silica nanoparticles have an average diameter of between about 12 nm and about 20 nm.

16. The method of claim 11, comprising the steps of adding oil well treatment fluids to the oil well in the order given to the oil well:
   a) adding an acid;
   b) adding a fresh water spacer;
   c) adding the aqueous brine resistant silicon dioxide nanoparticle dispersion pre-pad pill;
   d) adding a fresh water spacer; and
   e) inserting a pad of a frac treatment.

17. The method of claim 16, wherein the volume of the aqueous brine resistant silicon dioxide nanoparticle dispersion pre-pad pill is from about 500 to about 1,000 U.S. gallons per about 3,000 to about 6,000 U.S. barrels of the pad of the frac treatment.

18. The method of claim 17, wherein the silica nanoparticles have an average diameter of between about 12 nm and about 20 nm.

19. The method of claim 16, wherein the silica nanoparticles have an average diameter of between about 1 nm and about 100 nm.

20. The method of claim 16, wherein the silica nanoparticles have an average diameter of between about 12 nm and about 20 nm.

* * * * *